United States Patent [19]
Yamada

[11] Patent Number: 5,734,344
[45] Date of Patent: Mar. 31, 1998

[54] RADAR APPARATUS FOR DETECTING A DIRECTION OF A CENTER OF A TARGET

[75] Inventor: Yukinori Yamada, Susono, Japan

[73] Assignee: Toyota Jidosha Kabushiki Kaisha, Toyota, Japan

[21] Appl. No.: 741,206

[22] Filed: Oct. 29, 1996

[30] Foreign Application Priority Data

| Nov. 10, 1995 | [JP] | Japan | 7-292580 |
| Nov. 24, 1995 | [JP] | Japan | 7-306278 |
| Nov. 24, 1995 | [JP] | Japan | 7-306279 |

[51] Int. Cl.$^6$ .................................................. G01S 13/93
[52] U.S. Cl. ........................................... 342/72; 342/107
[58] Field of Search .................................. 342/70, 71, 72, 342/147, 107; 340/903

[56] References Cited

U.S. PATENT DOCUMENTS

| 5,023,617 | 6/1991 | Deering | 342/70 |
| 5,534,870 | 7/1996 | Avignon et al. | 342/70 |
| 5,585,798 | 12/1996 | Yoshioka et al. | 342/70 |
| 5,598,163 | 1/1997 | Cornic et al. | 342/70 |
| 5,612,699 | 3/1997 | Yamada | 342/70 |

FOREIGN PATENT DOCUMENTS

| 0 568 427 | 11/1993 | European Pat. Off. |
| 0 611 969 | 8/1994 | European Pat. Off. |
| 0 658 775 | 6/1995 | European Pat. Off. |
| 4-158293 | 6/1992 | Japan |
| 6-148319 | 5/1994 | Japan |
| 6-150195 | 5/1994 | Japan |
| 7-49377 | 2/1995 | Japan |
| 7-63842 | 3/1995 | Japan |
| 7-242133 | 9/1995 | Japan |

*Primary Examiner*—Daniel T. Pihulic
*Attorney, Agent, or Firm*—Cushman Darby & Cushman Intellectual Property Group of Pillsbury Madison & Sutro LLP

[57] ABSTRACT

A radar apparatus of an automotive vehicle includes a radar unit which radiates an electromagnetic wave to a target in a forward direction of the vehicle and receives reflection beams from the target to detect the target. A scanning control unit performs a beam scanning of the radar unit to the target so that the reflection beams during the beam scanning are received. A center direction determining unit detects a distribution pattern of the received reflection beams with respect to respective scanning angles of the radar unit, performs a similarity approximation of the distribution pattern by using an antenna directional gain pattern of the radar unit to produce an approximated distribution pattern, and determines a direction of a center of the target based on a peak of the approximated distribution pattern.

10 Claims, 27 Drawing Sheets

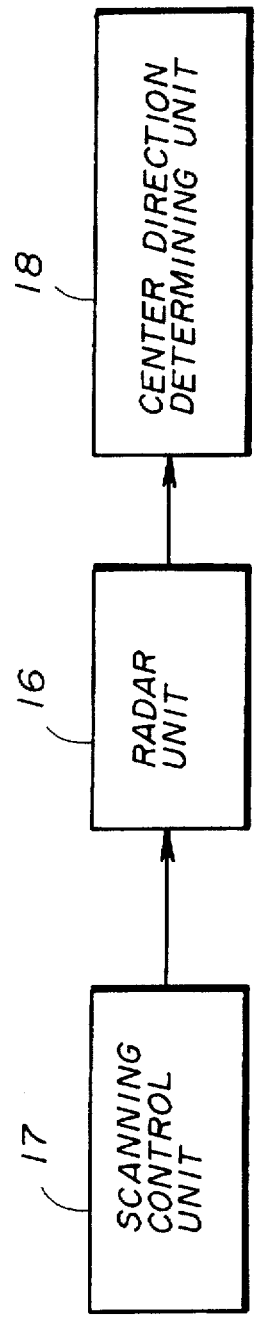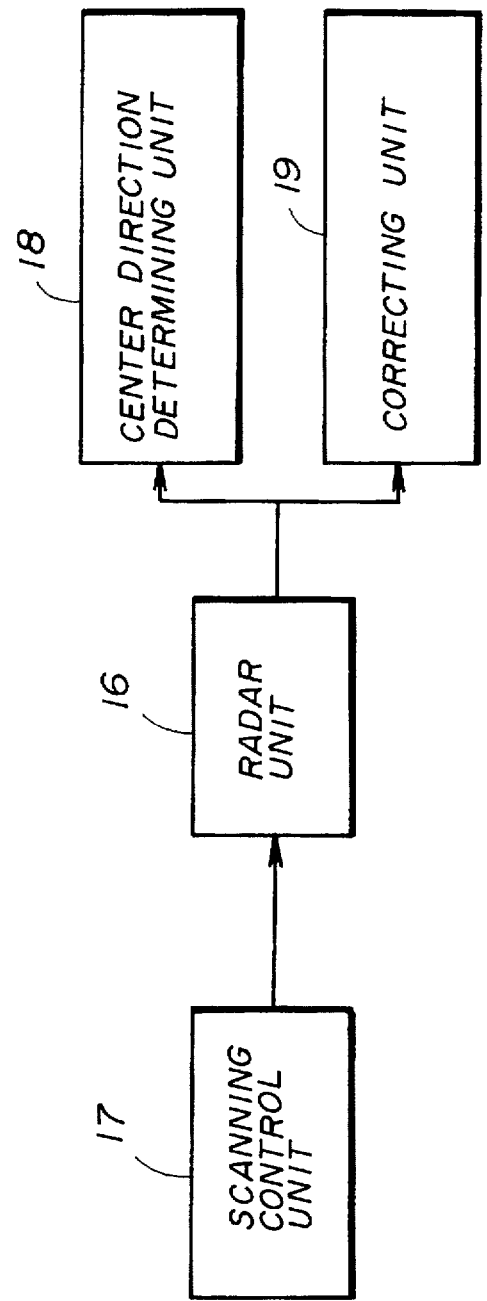

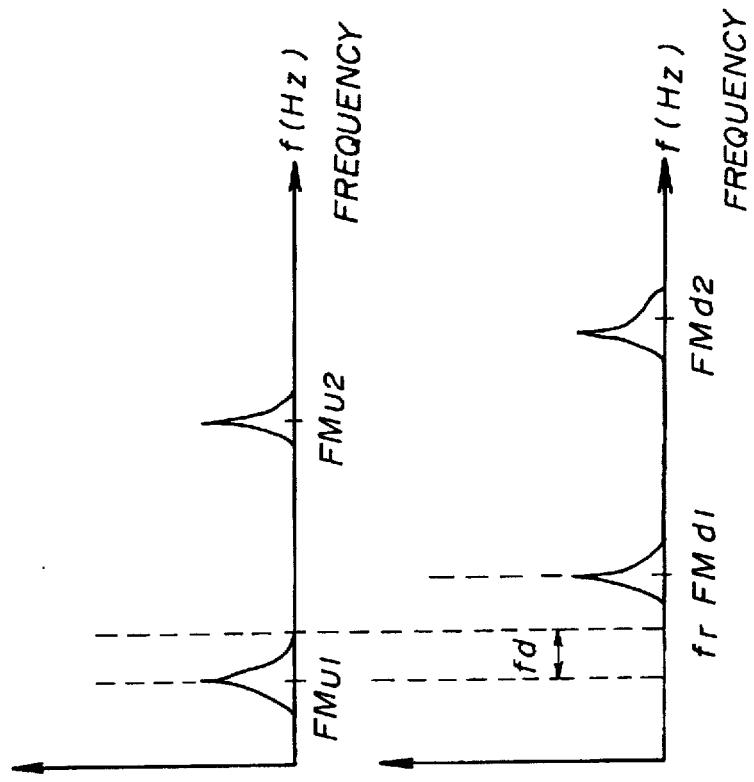

RADAR APPARATUS FOR DETECTING A DIRECTION OF A CENTER OF A TARGET

BACKGROUND OF THE INVENTION

(1) Field of the Invention

The present invention generally relates to a scanning radar apparatus, and more particularly to a scanning radar apparatus of an automotive vehicle which detects a direction of a center of a target, such as an advancing vehicle, by receiving reflection beams from the target.

(2) Description of the Related Art

In recent years, several types of radar devices for use in automotive vehicle have been developed in order to provide increased stability and operability of the automotive vehicle. The radar devices are capable of detecting a relative distance between a target (such as an advancing vehicle) and the vehicle, and a relative velocity of the target to a vehicle speed of the vehicle.

Japanese Laid-Open Patent Application No. 4-158293 teaches a radar apparatus which is one of the above-mentioned types. The radar apparatus utilizes a radar unit radiating a laser beam in order to detect a target such as an advancing vehicle in a forward direction of the radar apparatus.

To make use of the radar apparatus of the above publication, reflectors are mounted at a right-side rear end and a left-side rear end of the advancing vehicle. The radar apparatus receives reflection laser beams reflected off the reflectors of the advancing vehicle (the target). The radar apparatus detects a distance of each of the reflectors by measuring the time for the radiation laser beam to return to the radar apparatus after it has been reflected off the advancing vehicle. When the distances of the reflectors are detected to be the same, the radar apparatus determines a center scanning angle of the radar unit for a center of the advancing vehicle by detecting a mid-point between two scanning angles for the reflectors.

Another type is a radar apparatus utilizing a radar unit radiating an extremely high frequency (EHF) electromagnetic wave in order to detect the target. However, in a case of the radar apparatus of this type, the radar apparatus receive reflection radar beams containing noises from the reflectors of the advancing vehicle, and the reflection of the radiation radar beam on the advancing vehicle is not uniform.

It is difficult for the above-mentioned radar apparatus to accurately detect a position of an end of the advancing vehicle by measuring the time for the radiation radar beam to return to the radar apparatus after it has been reflected off the advancing vehicle. It is practically impossible for the above-mentioned radar apparatus to determine a center scanning angle of the radar unit for a center of the advancing vehicle by detecting a mid-point between two scanning angles for the reflectors as in the laser-beam radar apparatus.

Therefore, when the conventional radar apparatus utilizing the radar unit radiating the EHF electromagnetic wave is used, it is difficult to accurately detect the direction of the center of the target.

SUMMARY OF THE INVENTION

An object of the present invention is to provide an improved radar apparatus in which the above-described problems are eliminated.

Another object of the present invention is to provide a radar apparatus of an automotive vehicle which accurately detects a direction of a center of a target in a forward direction of the vehicle by performing a similarity approximation using an antenna directional gain pattern of a radar unit.

Still another object of the present invention is to provide a radar apparatus of an automotive vehicle which accurately detects individual targets in a forward direction of the vehicle by separately processing the data of received reflection signals related to one target from the data related to another when a plurality of adjacent targets are running in parallel in the forward direction of the vehicle.

A further object of the present invention is to provide a radar apparatus of an automotive vehicle which easily and accurately detects individual targets in a forward direction of the vehicle by separately performing a pairing of the data of received reflection signals related to one target and a pairing of the data of received reflection signals related to another target when a plurality of targets in the forward direction of the vehicle are detected.

The above-mentioned objects of the present invention are achieved by a radar apparatus which includes: a radar unit which radiates an electromagnetic wave to a target in a forward direction of the vehicle and receives reflection beams from the target to detect the target; a scanning control unit which performs a beam scanning of the radar unit to the target so that the reflection beams during the beam scanning are received; and a center direction determining unit which detects a distribution pattern of the received reflection beams with respect to respective scanning angles of the radar unit, performs a similarity approximation of the distribution pattern by using an antenna directional gain pattern of the radar unit to produce an approximated distribution pattern, and determines a direction of a center of the target based on a peak of the approximated distribution pattern.

The radar apparatus of the present invention can determine a direction of a center of the target by performing the similarity approximation even when the reflection of the radiation beam on the target is not uniform and noises are superimposed in the received reflection beams. Accordingly, it is possible for the radar apparatus of the present invention to accurately detect the direction of the center of the target for a center scanning angle of the radar unit.

BRIEF DESCRIPTION OF THE DRAWINGS

Other objects, features and advantages of the present invention will become more apparent from the following detailed description when read in conjunction with the accompanying drawings in which:

FIGS. 1A and 1B are block diagrams showing basic concepts of the present invention;

FIG. 15A is a diagram showing a spectrum level of an up-frequency determined by an FFT circuit in FIG. 13;

FIG. 15B is a diagram showing a spectrum level of a down-frequency determined by the FFT circuit in FIG. 13;

DETAILED DESCRIPTION OF THE PREFERRED EMBODIMENTS

A description will now be given of the preferred embodiments of the present invention with reference to the accompanying drawings.

Figure 2:
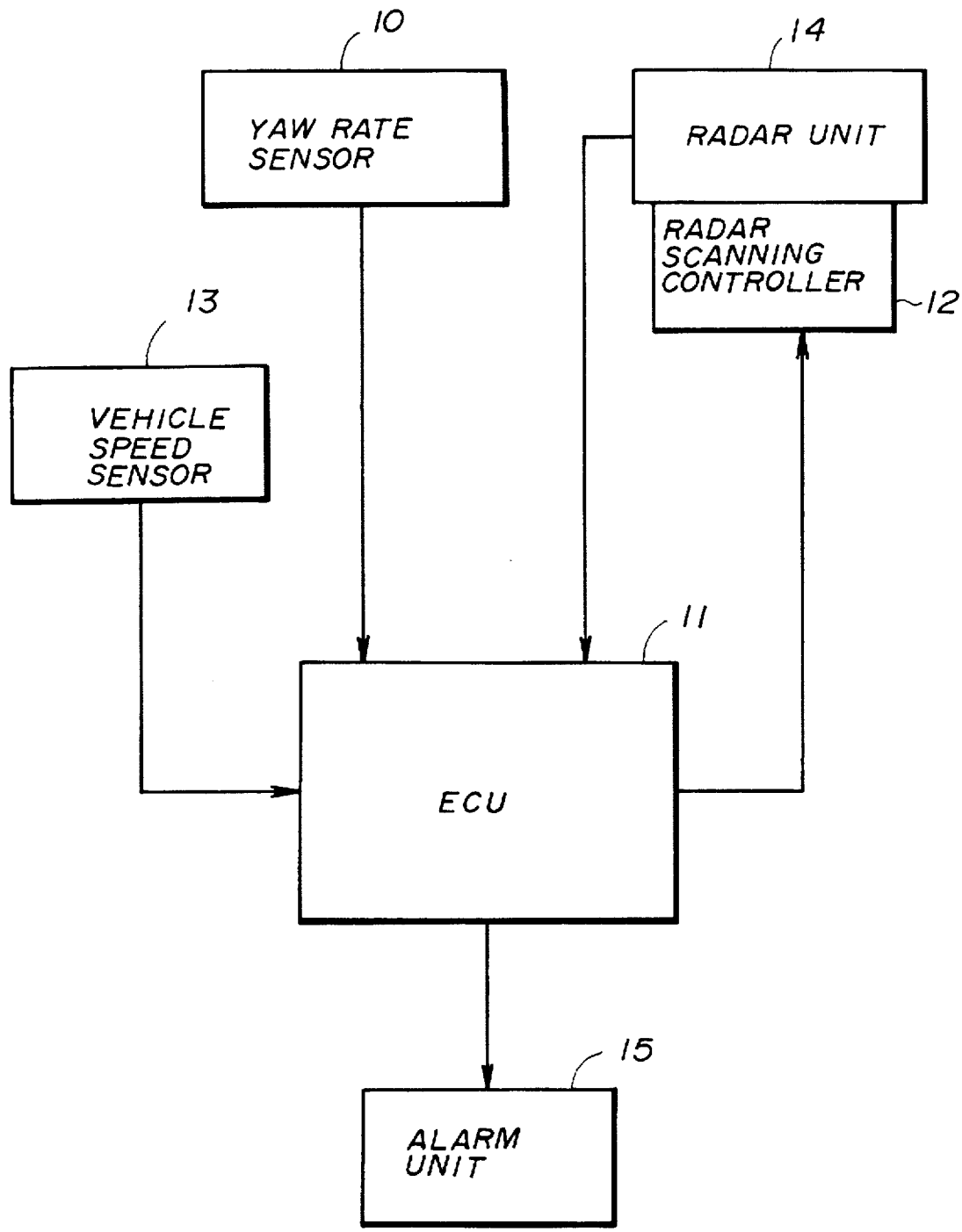
FIG. 2 is a block diagram of a radar apparatus in one embodiment of the present invention.

FIG. 2 shows a radar apparatus in one embodiment of the present invention. This radar apparatus is installed on an automotive vehicle.

Referring to FIG. 2, the radar apparatus of the present embodiment comprises a yaw rate sensor 10, an electronic control unit (ECU) 11, a radar scanning controller 12, a vehicle speed sensor 13 and a radar unit 14. The radar apparatus of the present embodiment further includes an alarm unit 15.

The yaw rate sensor 10 generates a yaw rate signal indicative of a measured yaw rate of the vehicle by using an acceleration sensor having a piezoelectric element, and supplies the yaw rate signal to the ECU 11.

The vehicle speed sensor 13 generates a vehicle speed signal indicative of a measured vehicle speed of the vehicle, and supplies the vehicle speed signal to the ECU 11.

The ECU 11 receives the vehicle speed signal from the vehicle speed sensor 13. The ECU 11 receives the yaw rate signal from the yaw rate sensor 10. The ECU 11 performs a filtering of the received yaw rate signal and determines a yaw rate signal after the filtering is performed. The ECU 11 determines a measured radius of curvature of a present path along which the vehicle is presently running, by using the determined yaw rate signal and the vehicle speed signal.

By using the measured radius of curvature of the present path, the ECU 11 is capable of providing an estimated radius of curvature of a following path along which the vehicle is about to run at a following time.

Further, the ECU 11 generates a scanning angle signal indicative of a scanning angle of the radar unit 14, and supplies the scanning angle signal to the radar scanning controller 12. The radar unit 14 is controlled by the radar scanning controller 12 so that a beam radiation axis of the radar unit 14 is moved to the target in accordance with the scanning angle signal from the ECU 11. Accordingly, the ECU 11 controls the radar unit 14 in accordance with the scanning angle signal through the radar scanning controller 12.

The radar unit 14 of the present embodiment is a frequency-modulation-continuous-wave (FMCW) radar unit which radiates an extremely high frequency (EHF) electromagnetic wave as a radiation beam to a target in a forward direction of the vehicle. A beam scanning of the radar unit 14 to the target is performed under the control of the radar scanning controller 12 by moving the radiation beam of the radar unit 14 across the target from the left to the right of the target on the plane of a horizontal forward running direction of the vehicle.

The radar unit 14 supplies signals indicative of results of the detection of the target to the ECU 10. These signals are generated by the radar unit 14 by receiving reflection beams after the radiation beam has been reflected off the target. In response to the signals from the radar unit 14, the ECU 10 is capable of determining a relative distance between the target and the vehicle and a relative velocity of the target relative to the vehicle speed of the vehicle.

As described above, the ECU 11 determines, in response to the received reflection beams, the relative distance and the relative velocity related to the target. By using the relative distance and the relative velocity, the ECU 11 detects whether the vehicle is in a dangerous condition with respect to the target. When it is determined that the vehicle is in a dangerous condition, the ECU 11 switches ON the alarm unit 15 in order to provide a warning of the dangerous condition to a vehicle operator.

Figure 3:
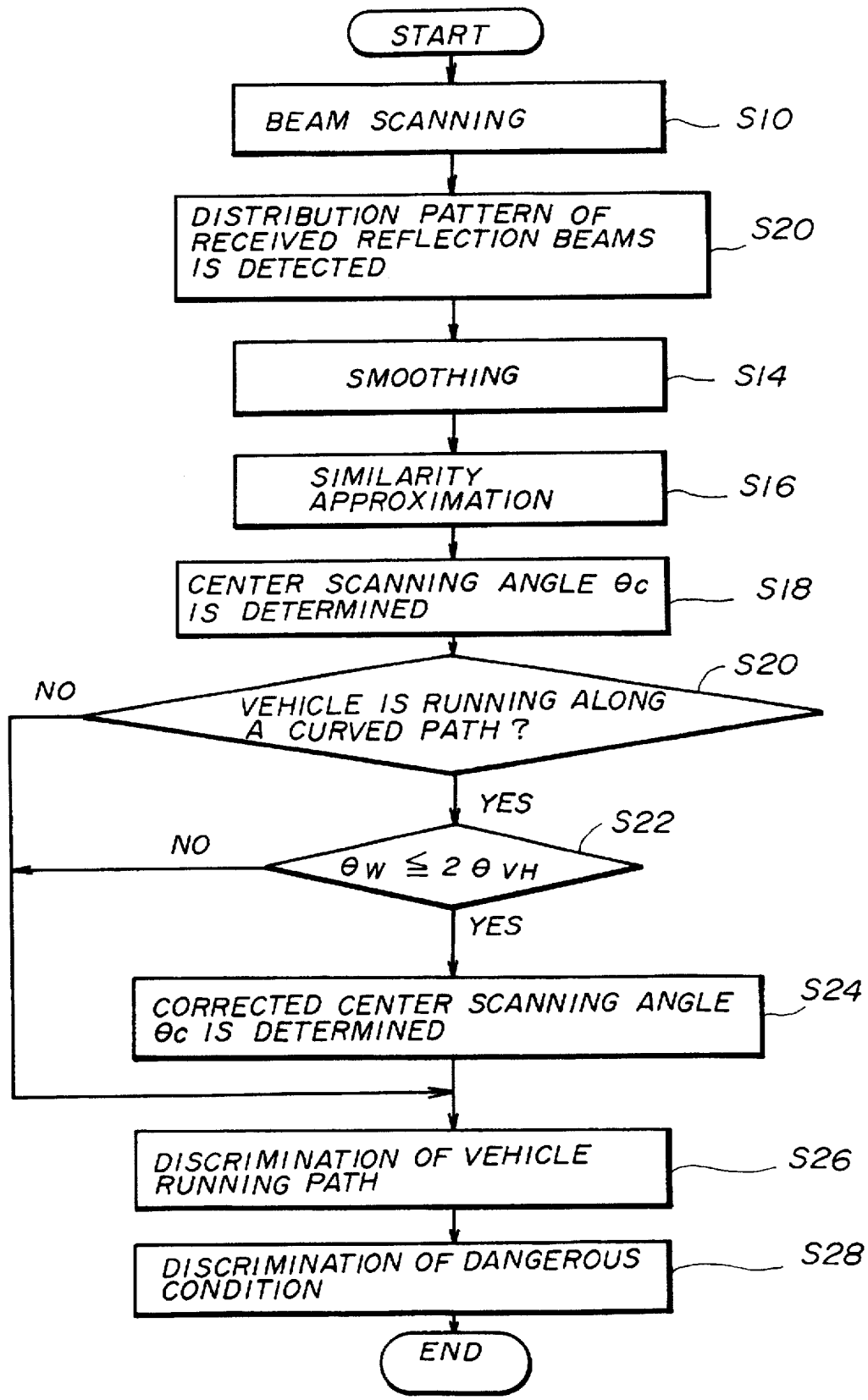
FIG. 3 is a flowchart for explaining a center direction determining procedure performed by the radar apparatus in FIG. 2.

FIG. 3 shows a center direction determining procedure which is executed by the ECU 11 of the radar apparatus in FIG. 2 by using the yaw rate sensor 10, the vehicle speed sensor 13, the radar unit 14, and the radar scanning controller 12. This procedure is repeatedly executed by the ECU 11 at intervals of a predetermined time.

Referring to FIG. 3, the ECU 11, at step S10, allows the radar scanning controller 12 to perform the beam scanning of the radar unit 14 to the target. The beam scanning is performed under the control of the radar scanning controller 12 by moving the radiation beam of the radar unit 14 across the target from the left to the right of the target on the plane of the horizontal forward running direction of the vehicle.

The ECU 11, at step S12, detects a distribution pattern of received reflection beams with respect to respective scanning angles (θ) of the radar unit 14, based on the reflection beams received from the target. When the relative distances and the relative velocities related to the received reflection beams are detected to be the same, the ECU 11 obtains a plotting of the distribution pattern of the received reflection beams with respect to the respective scanning angles of the radar unit 14.

Figure 4:
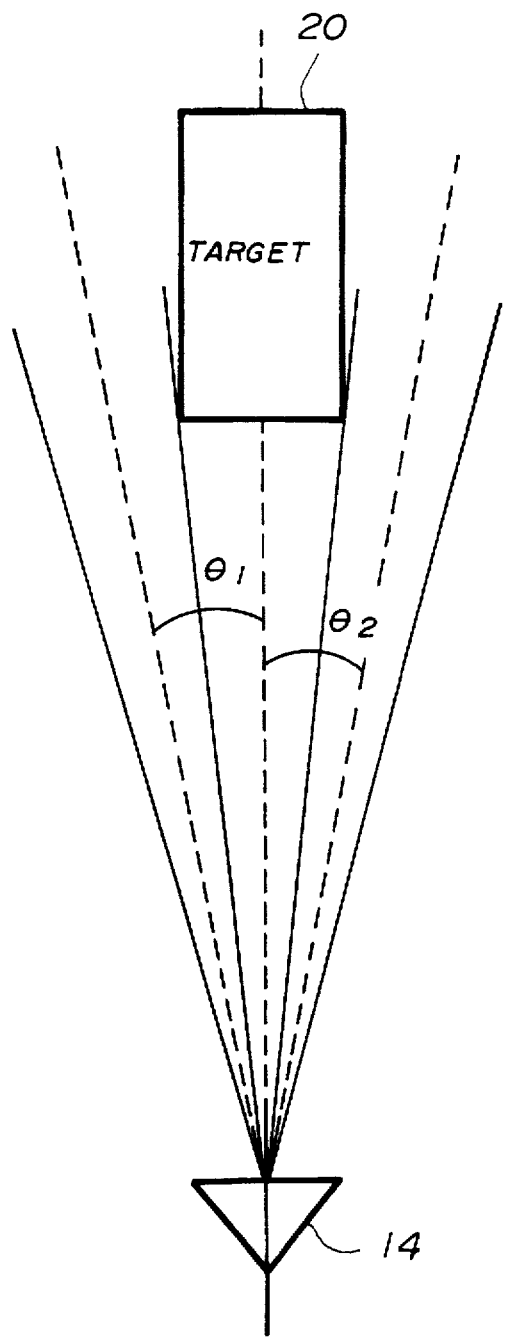
FIG. 4 is a diagram showing a beam scanning of a radar unit to a target which is performed by a radar scanning controller.

FIG. 4 shows a beam scanning of the radar unit 14 to a target 20, which is performed by the radar scanning controller 12. In FIG. 4, the radar scanning controller 12 moves the radiation beam of the radar unit 14 across the target 20 from the left to the right on the plane of the horizontal forward running direction of the vehicle. A scanning angle of the radar unit 14 is an angle between a direction of the beam radiation axis of the radar unit 14 and the horizontal forward running direction of the vehicle. This angle is changed during the beam scanning.

During the beam scanning in FIG. 4, the beam radiation axis of the radar unit 14 is moved relative to the forward running direction of the vehicle across the target 20 from a left-side rear end of the target 20 to a right-side rear end of the target 20. Detection of the received reflection beams from the target 20 starts when the beam radiation axis of the radar unit 14 is at a first scanning angle θ1 for the left-side rear end, and the detection of the received reflection beams ends when the beams radiation axis of the radar unit 14 is at a second scanning angle θ2 for the right-side rear end.

Figure 5:
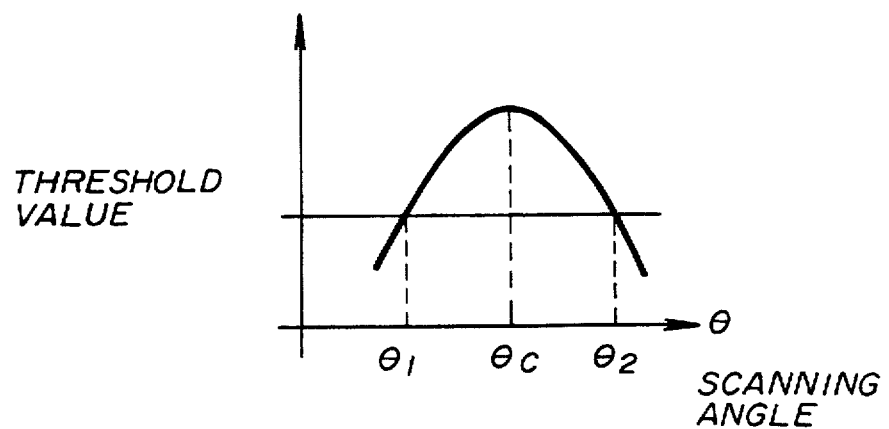
FIG. 5 is a diagram showing an ideal distribution pattern of received reflection beams in which no noise is superimposed.

FIG. 5 shows an ideal distribution pattern of received reflection beams in which no noise is superimposed. The distribution pattern of the received reflection beams in FIG. 5 is obtained if the beam scanning of the radar unit 14 is performed and the reflection of the radiation beam on the target 20 is ideal. However, the limits of a beam scanning range when detecting the target in an actual case are not clear, and the reflection of the radiation beam on the target in such a case is not uniform and it is complicated.

Figure 6:
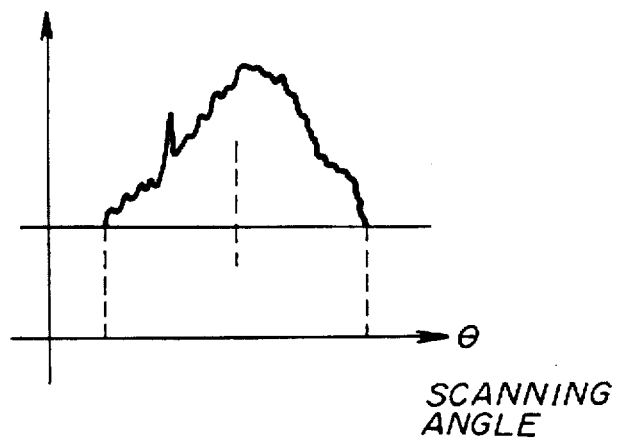
FIG. 6 is a diagram showing an actual distribution pattern of received reflection beams in which noises are superimposed.

FIG. 6 shows an actual distribution pattern of received reflection beams in which noises are superimposed. The distribution pattern of the received reflection beams in FIG. 6 is obtained in an actual case. As shown, the received reflection beams in the actual case contains noises superimposed therein due to the non-uniform reflection on the target.

Referring back to FIG. 3, after the step S12 is performed, step S14 performs a smoothing of the distribution pattern of the received reflection beams. Influences of the noises in the actual distribution pattern are reduced by this smoothing.

Figure 7:
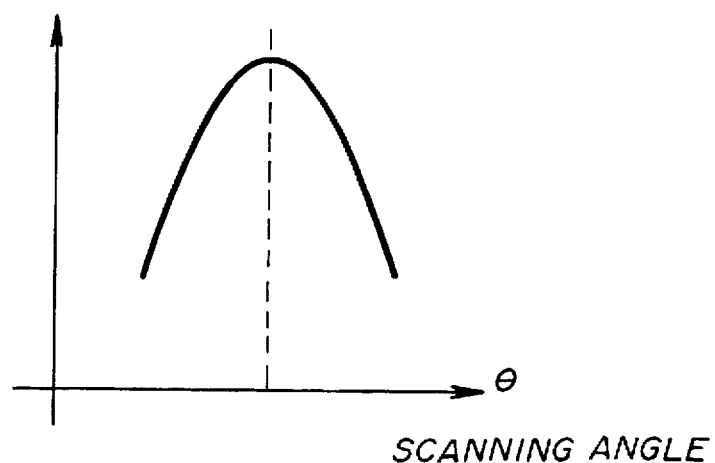
FIG. 7 is a diagram showing an antenna directional gain pattern with respect to a scanning angle of the radar unit.
Figure 8:
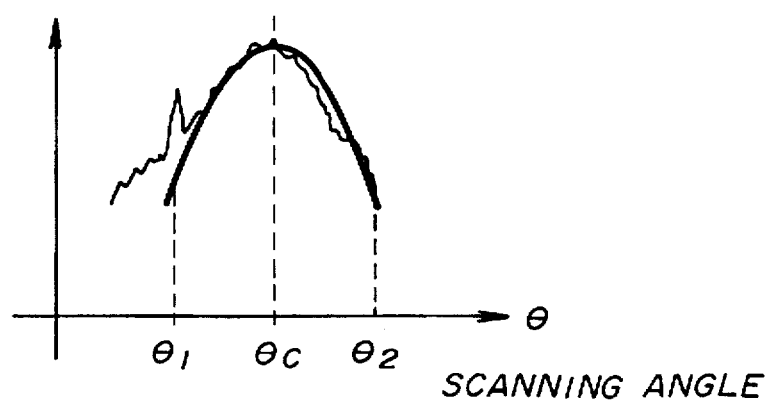
FIG. 8 is a diagram showing a similarity approximation of the distribution pattern in FIG. 6 using the antenna directional gain pattern in FIG. 7.

After the step S14 is performed, step S16 performs a similarity approximation of the distribution pattern by using an antenna directional gain pattern of the radar unit 14. FIG. 7 shows the antenna directional gain pattern for the respective scanning angles of the radar unit 14. FIG. 8 shows a similarity approximation of the distribution pattern in FIG. 6 using the antenna directional gain pattern in FIG. 7.

As shown in FIG. 8, when the similarity approximation is performed, an approximated distribution pattern is produced from the distribution pattern of the received reflection beams after the smoothing, so that it is overlaid over the antenna directional gain pattern. Respective correlations of the approximated distribution pattern and the antenna directional gain pattern when the scanning angle θ is changed from the first scanning angle θ1 for the left-side rear end of the target 20 to the second scanning angle θ2 for the right-side rear end of the target 20 are calculated by the ECU 11.

After the step S16 is performed, step S18 determines a direction of a center of the target 20 for a center scanning angle (θc) of the radar unit 14. As shown in FIG. 8, the direction of the center of the target 20 is determined based on a peak of the approximated distribution pattern. Based on the direction of the center of the target 20, the ECU 10 generates a signal indicating the direction of the center of the target 10 for the center scanning angle (θc) of the radar unit 14.

Even when the reflection of the radiation beam on the target is not uniform and noises are superimposed in the received reflection beams, a correspondence between the distribution pattern of the received reflection beams and the antenna directional gain pattern can be detected in the above manner.

Accordingly, the radar apparatus of the present embodiment can determine the direction of the center of the target by performing the above similarity approximation. It is possible for the radar apparatus of the present embodiment to accurately detect the direction of the center of the target for the center scanning angle θc of the radar unit.

After the step S18 is performed, step S20 detects whether the vehicle is presently running along a curved path. The ECU 11 determines a radius (R1) of curvature of a present path along which the vehicle is presently running, by using a measured yaw rate signal (YAW) from the yaw rate sensor 10 and a measured vehicle speed signal (SPD) from the vehicle speed sensor 12. The radius R1 of curvature of the present path is determined in accordance with the equation: R1=SPD/YAW. That is, the radius R1 of curvature of the present path is calculated by dividing the measured vehicle speed SPD by the measured yaw rate YAW. By comparing the determined radius R1 of curvature of the present path with a predetermined reference value, the ECU 11 detects whether the vehicle is presently running along a curved path.

When the radius R1 of curvature of the present path is above the predetermined reference value, it is determined that the vehicle is not presently running along a curved path. At this time, the ECU 11 generates a signal indicating the determined center scanning angle θc (the step S18) in order to detect a direction of the center of the target. Further, steps S26 and S28 which will be described later are performed by the ECU 11. The center direction determining procedure in FIG. 3 ends after the steps S26 and S28 are performed.

On the other hand, when the radius R1 of curvature of the present path is below the predetermined reference value, it is determined that the vehicle is presently running along a curved path.

When the result at the step S20 is affirmative (the vehicle is presently running along a curved path), step S22 is performed by the ECU 11. Step S22 detects whether a beam scanning range θw of the target is below a reference range value (=2θvh). This discrimination is made to determine whether the beam radiation axis of the radar unit 14 directed to the target when the center scanning angle is determined at the step S18 is excessively slanting with respect to the horizontal forward running direction of the vehicle.

The ECU 11 at the step S22 determines the beam scanning range θw of the target by a difference between a lower limit of the scanning angle in the level of the received reflection beams which is above a threshold value and an upper limit of the scanning angle δ in the level of the received reflection beams which is above the threshold value.

The above reference range value 2θvh is determined by the following equation.

$$2θvh = 2 \cdot \tan^{-1}(W/2 \cdot L)$$

where L is the measured relative distance of the target and W is a width of the target. The width W of the target (the advancing vehicle) in the present case is about 2 meter. According to the above equation, the value of θvh, or ½ of the reference range value, corresponds to a beam scanning range of the radar unit 14 for ½ of the width of the advancing vehicle.

Figure 9:
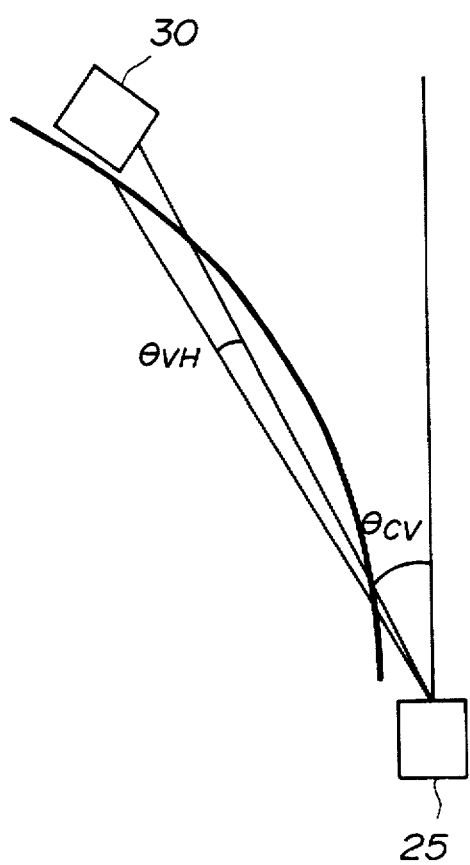
FIG. 9 is a diagram showing a case in which a vehicle is running along a curved path and a target in the curve path is detected by the radar unit.

FIG. 9 shows a case in which a vehicle 25 is running along a curved path and a target 30 in the curve path is detected by the radar apparatus of the vehicle 25.

Figure 10A:
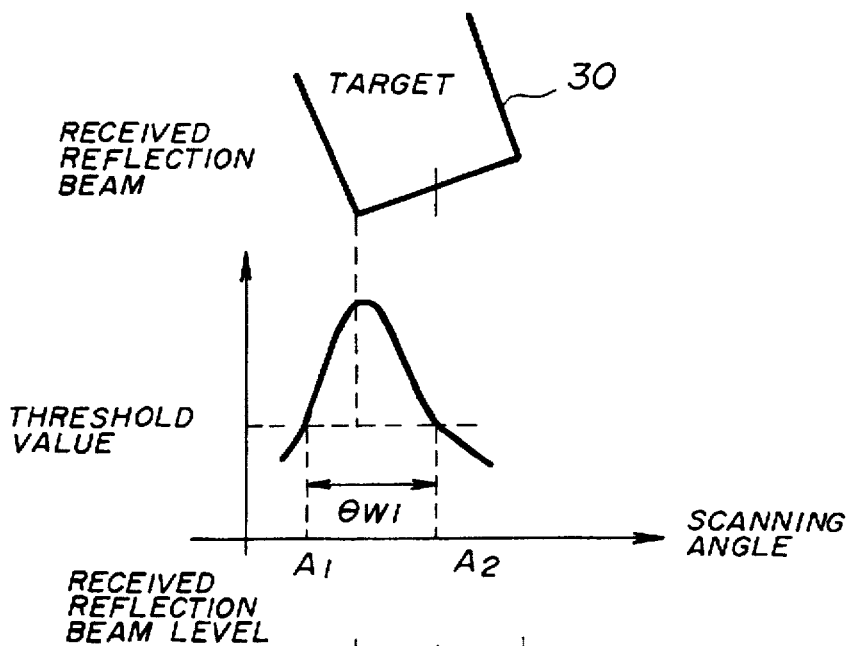
FIGS. 10A, 10B and 10C are diagrams for explaining a correction of a center scanning angle in the case of FIG. 9.

In the case of FIG. 9, the beam radiation axis of the radar unit 14 directed to the target 30 is excessively slanting with respect to the horizontal forward running direction of the vehicle. FIG. 10A shows a distribution pattern of received reflection beams obtained in the slanting case of FIG. 9. The level of the received reflection beams in the slanting case of FIG. 9 is the maximum when the beam radiation axis of the radar unit 14 is directed to the left-side rear end of the target 30 as shown in FIG. 10A.

Figure 10B:
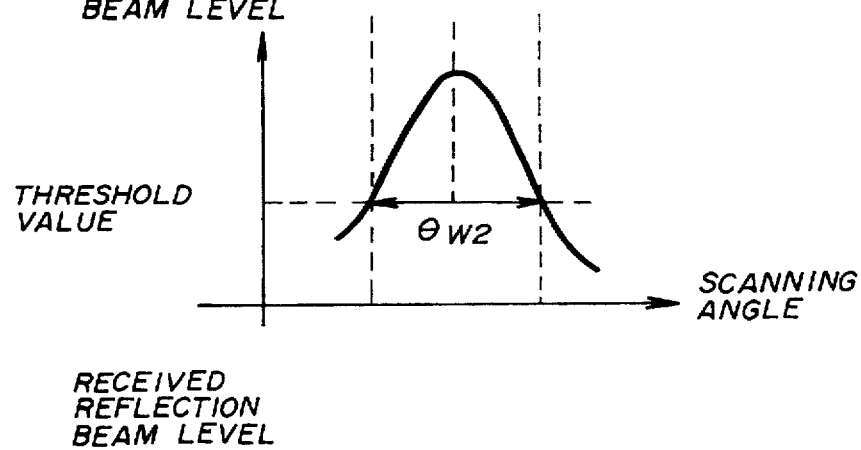

FIG. 10B shows a distribution pattern of received reflection beams obtained in a normal case in which the beam radiation axis of the radar unit 14 directed to the target 30 accords with the horizontal forward running direction of the vehicle.

As shown, a beam scanning range θw1 of the target 30 in the slanting case of FIG. 10A is smaller than a beam scanning range θw2 in the normal case of FIG. 10B. The above reference range value 2θvh used at the step S22 is defined by an estimated value of the beam scanning range θw2 in the normal case. Accordingly, when the vehicle 25 is running along the curved path and the beam scanning range θw of the target is below the reference range value 2θvh, it is necessary to correct the center scanning angle θc determined at the step S18.

When the result at the step S22 is affirmative (θw ≤ 2θvh), step S24 is performed by the ECU 11. Step S24 determines a corrected center scanning angle θc so as to eliminate an offset of the center scanning angle θc which is produced at the step S18 in the slanting case.

Figure 10C:
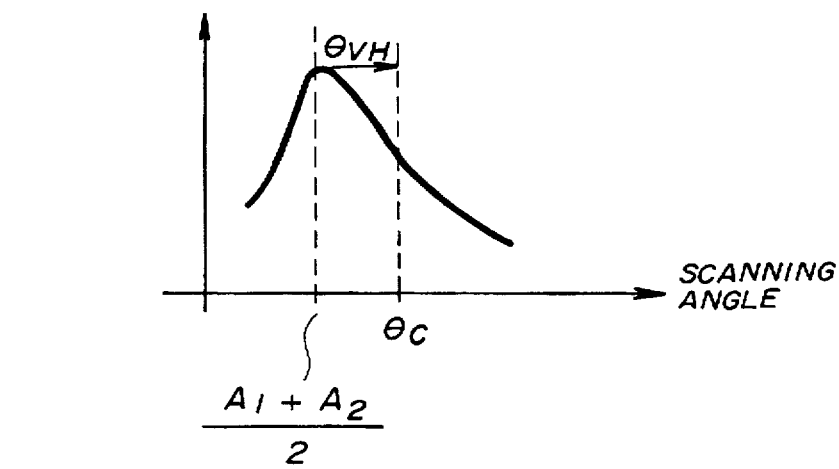

FIG. 10C shows a correction of a center scanning angle in the case of FIG. 9. As shown in FIG. 10C, the corrected center scanning angle θc is calculated by addition of a tentatively determined center scanning angle for the midpoint of the lower limit "A1" and the upper limit "A2" and the value of θvh (which is equal to ½ of the reference range value corresponding to the beam scanning range of the radar unit 14 for ½ of the width of the target). That is, the corrected center scanning angle θc in the case of FIG. 9 is determined at the step S24 by the following equation.

$$θc = (A1 + A2)/2 + θvh$$

where A1 is the lower limit of the scanning angle, A2 is the upper limit of the scanning angle, and θvh is equal to ½ of the reference range value of the radar unit 14.

Referring back to FIG. 3, after the step S24 is performed, step S26 is performed by the ECU 11.

On the other hand, when the result at the step S22 is negative (θw > 2θvh), the step S26 is performed and the step S24 (the correction of the center scanning angle) is not performed. At this time, the ECU 11 generates a signal indicating the determined center scanning angle θc (the step S18) in order to detect a direction of the center of the target.

As described above, when the vehicle is running along a curved path and the beam radiation axis of the radar unit directed to the target is slanting with respect to the forward direction of the vehicle, the radar apparatus of the present embodiment can eliminate the offset of the center scanning angle θc which is determined in the slanting case. Accordingly, it is possible for the present embodiment to accurately detect the center scanning angle θc of the radar unit for the center of the target in the slanting case also.

Step S26 detects whether the center scanning angle θc, which is determined at the step S18 or the step S24, meets the following conditions.

$$θcv - θvh < θc < θcv + θvh \quad θcv = \sin^{-1}(L/2 \cdot R1)$$

where θcv is a center scanning angle for a center of a roadway lane of the vehicle, L is the measured relative distance of the target, and R1 is the radius of curvature of the present path. When the above conditions are met by the center scanning angle θc, it is determined that the target is in the roadway lane which is the same as that of the vehicle.

After the step S26 is performed, step S28 is performed by the ECU 11. Step S28 detects whether the vehicle is in a dangerous condition with respect to the target, by receiving the relative distance and the relative velocity related to the target. When it is determined that the vehicle is in a dangerous condition, the ECU 11 switches ON the alarm unit 15 in order to provide a warning of the dangerous condition to a vehicle operator. After the step S28 is performed, the center direction determining procedure in FIG. 3 ends.

FIG. 1A shows a radar apparatus according to a basic concept of the present invention. The basic concept of the present invention is already apparent from the foregoing description of the above embodiment. As shown in FIG. 1A, the radar apparatus includes a radar unit 16, a scanning control unit 17, and a center direction determining unit 18.

The radar unit 16 is constructed by the radar unit 14 of the above-described embodiment in FIG. 2. The radar unit 16 radiates an electromagnetic wave to a target in a forward direction of a vehicle and receives reflection beams from the target to detect the target.

The scanning control unit 17 is constructed by the radar scanning controller 12 of the above embodiment in FIG. 2 and the step S10 of the center direction determining procedure executed by the ECU 11. The scanning control unit 17 performs a beam scanning of the radar unit 16 to the target so that the reflection beams during the beam scanning are received.

The center direction determining unit 18 is constructed by the steps S12 through S18 in the center direction determining procedure executed by the ECU 11. The center direction determining unit 18 detects a distribution pattern of the received reflection beams with respect to respective scanning angles of the radar unit 16. The determining unit 18 performs a similarity approximation of the distribution pattern by using an antenna directional gain pattern of the radar unit 16 to produce an approximated distribution pattern. The determining unit 18 determines a center scanning angle of the radar unit 16 for a center of the target by a scanning angle of the approximated distribution pattern corresponding to a peak of the antenna directional gain pattern.

Further, FIG. 1B shows a radar apparatus according to another basic concept of the present invention. This basic concept of the invention is also apparent from the foregoing description of the above embodiment. As shown in FIG. 1B, this radar apparatus includes a correcting unit 19 in addition to the units 16, 17 and 18 in FIG. 1A. In FIG. 1B, the elements which are the same as corresponding elements in FIG. 1A are designated by the same reference numerals, and a description thereof will be omitted.

Referring to FIG. 1B, the correcting unit 19 is constructed by the steps S20 through S24 in the center direction determining procedure executed by the ECU 11. The correcting unit 19 determines a corrected center scanning angle from a reference range value corresponding to a beam scanning range of the radar unit 16 for a width of the target, and from a scanning angle of the radar unit 16 corresponding to a mid-point of lower and upper limits of the scanning angle in the distribution pattern, when the vehicle is running along a curved path and the beam scanning range is below the reference range value.

Further, the correcting unit 19 in FIG. 1B includes a unit for detecting whether the vehicle is running along a curved path, by comparing a radius of curvature of a present path along which the vehicle is presently running with a predetermined reference value. The radius of curvature is determined by using a measured yaw rate and a measured vehicle speed.

Further, the correcting unit 19 includes a unit for detecting whether a beam radiation axis of the radar unit 16 directed to the target is slanting with respect to the forward direction of the vehicle.

Figure 11:
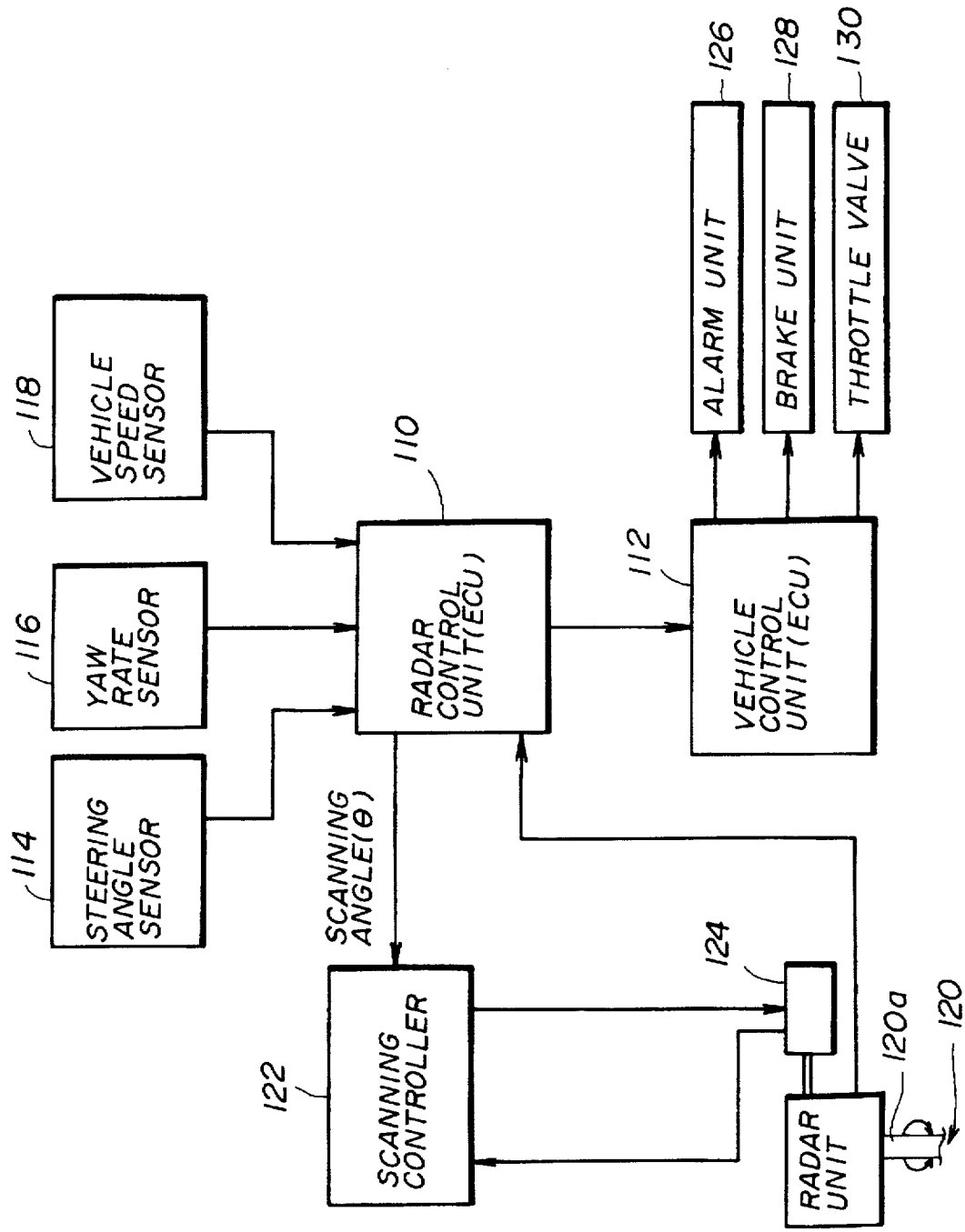
FIG. 11 is a block diagram of a radar apparatus in another embodiment of the present invention.

Next, FIG. 11 shows a radar apparatus in another embodiment of the present invention.

Referring to FIG. 11, the radar apparatus is controlled by a radar control unit 110 and a vehicle control unit 112 which are two separate electronic control units (ECU). This radar apparatus is installed on an automotive vehicle.

A steering angle sensor 114, a yaw rate sensor 116, and a vehicle speed sensor 118 are connected to inputs of the radar control unit (ECU) 110. The steering angle sensor 114 generates a signal indicative of a steering angle of a steering wheel (not shown) of the vehicle. The yaw rate sensor 116 generates a signal proportional to an angular velocity of the vehicle about a center of gravity of the vehicle. The vehicle speed sensor 118 generates a signal indicative of a vehicle speed of the vehicle.

The radar control unit (ECU) 110 is capable of providing an estimated radius of a turning circle of the vehicle by receiving these signals from the steering angle sensor 114, the yaw rate sensor 116 and the vehicle speed sensor 118.

A radar unit 120 is connected to an input of the radar control unit 110. An output of the radar control unit 110 is connected to a scanning controller 122.

The radar unit 120 of the present embodiment is a frequency-modulation-continuous-wave (FMCW) radar unit which radiates an extremely high 10 frequency (EHF) electromagnetic wave as the radiation beam to a target in a forward direction of the vehicle. The radar unit 120 has a rotating shaft 120a on which an antenna of the radar unit 120 is rotatably supported. By rotating the radar unit 120 on the rotating shaft 120a, the beam radiation axis of the radar unit 120 is changed.

A moving mechanism 124 is engaged with the radar unit 120 to move the beam radiation axis of the radar unit 120. The operation of the moving mechanism 124 is performed by the scanning controller 122 through a feedback control. A scanning angle signal (θ) output from the radar control unit 110 is supplied to the scanning controller 122. The scanning controller 122 feedback-controls the moving mechanism 124 to move the beam radiation axis of the radar unit 120 so that a scanning angle of the radar unit 120 is adjusted to be in accordance with a scanning angle indicated by the scanning angle signal (θ).

The radar control unit 110 controls a beam scanning of the radar unit 120 to the target through the scanning controller 122 by increasing or decreasing the scanning angle (θ) at a given period of time. By moving the radiation beam of the radar unit 120 across the target from the left to the right of the target on the plane of the horizontal forward running direction of the vehicle, the beam scanning of the radar unit 120 is carried out.

Signals related to the received reflection beams from the target are supplied from the radar unit 120 to the radar control unit 110. In response to these signals, the radar control unit (ECU) 110 detects the target in the forward direction of the vehicle. The results of the detection of the target are supplied from the radar control unit 110 to the vehicle control unit (ECU) 112.

An alarm unit 126, a brake unit 128, and a throttle valve 130 are connected to outputs of the vehicle control unit 112. When the vehicle is detected to be in a dangerous condition with respect the target, the vehicle control unit 112 switches ON the alarm unit 126, controls the brake unit 128, and/or controls the throttle valve 130, in order to provide a warning of the dangerous condition to a vehicle operator and decelerate the vehicle for safety.

Figure 12:
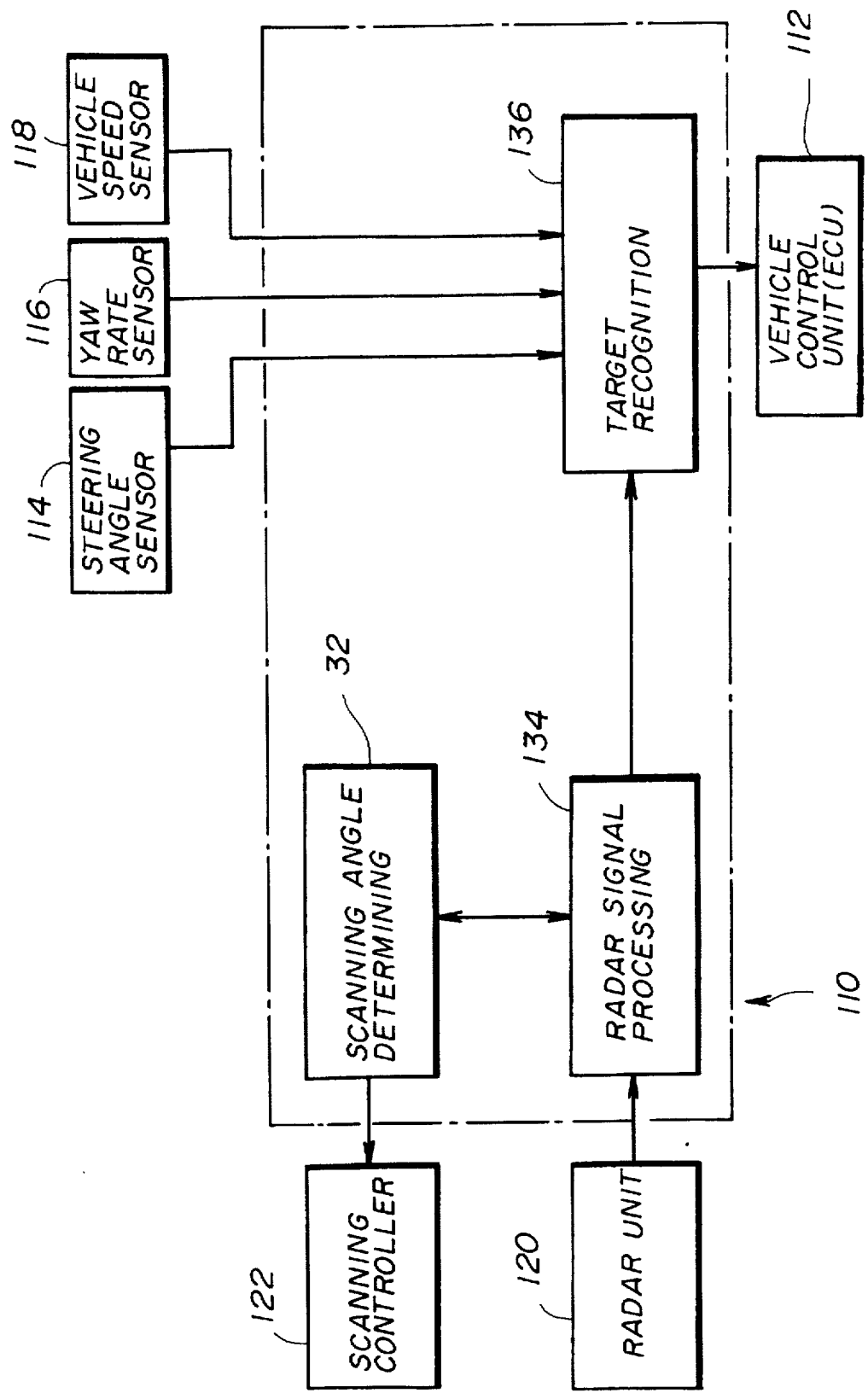
FIG. 12 is a block diagram of a radar control unit of the radar apparatus in FIG. 11.

FIG. 12 shows a construction of the radar control unit (ECU) 110 of the radar apparatus in FIG. 11.

The radar control unit 110 is essentially made up of a microcomputer. As shown in FIG. 12, the radar control unit 110 comprises a scanning angle determining part 132, a radar signal processing part 134, and a target recognition part 136.

The scanning angle determining part 132 determines a scanning angle of the radar unit 120, and supplies a scanning angle signal indicating the scanning angle to the scanning controller 122 as described above. In the scanning angle determining part 132, the scanning angle (θ) indicated by the supplied scanning angle signal is changed in synchronism with a control timing of the radar signal processing part 134.

When any target is detected as a result of the beam scanning of the radar unit 120, the radar signal processing part 134 receives signals of the reflection beams of the target from the radar unit 120. In response to these signals, the radar signal processing part 134 determines a relative distance between the target and the and the vehicle and a relative velocity of the target to the vehicle speed of the vehicle. Data of the relative distance and the relative velocity related to each of a plurality of targets, and correlations between such data and respective scanning angles with respect to each of the targets are generated by the radar signal processing part 134, and they are supplied to the target recognition part 136. A construction of the radar signal processing part 134 will be described later with reference to FIG. 13.

When the relative distances, the relative velocities, and the correlations for the respective targets from the radar signal processing part 134 are received, the target recognition part 136 generates a set of groups of recognition data, each group of the recognition data related to the relative distance, the relative velocity and the correlations of the same target. The target recognition part 136 provides an estimated radius (R) of the turning circle of the vehicle based on the signals output from the steering angle sensor 114, the yaw rate sensor 116 and the vehicle speed sensor 118, as described above.

The radar apparatus of the present embodiment is characterized by the target recognition part 136 which separately generates each of groups of the recognition data of the relative distances, the relative velocities, and the correlations to the respective scanning angles, by using the estimated radius (R) of the turning circle of the vehicle, which are separated from each other for one of the targets being detected.

Figure 13:
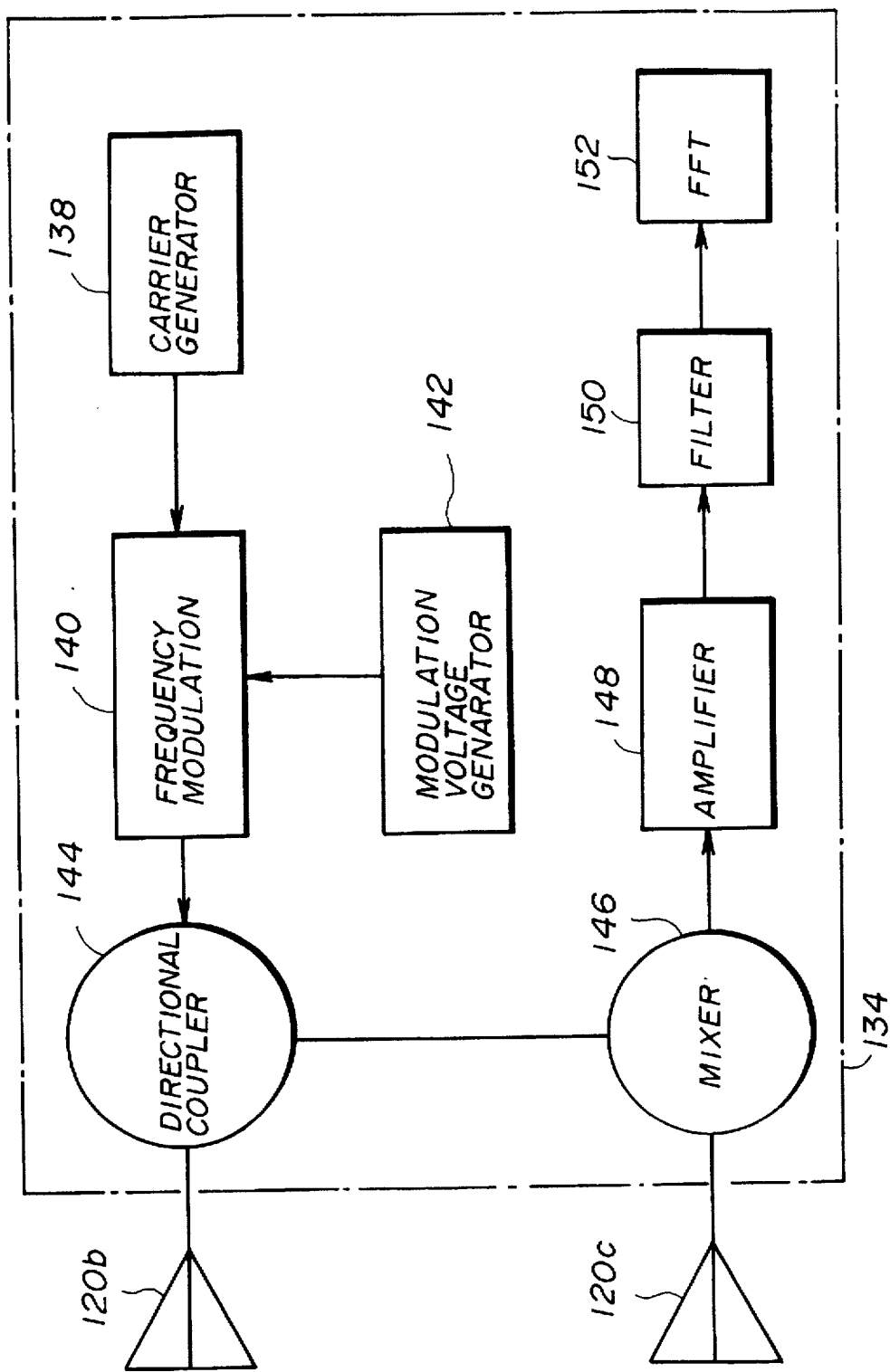
FIG. 13 is a block diagram of a radar signal processing part of the radar control unit in FIG. 12.

FIG. 13 shows a construction of the radar signal processing part 134 in FIG. 12. As shown in FIG. 13, a radiation antenna 120b and a receiving antenna 120c are included in the radar unit 120. The radar signal processing part 134 comprises a carrier generator 138, frequency modulation circuit 140, a modulation voltage generator 142, and a directional coupler 144. These elements constitute a beam radiation portion of the FMCW radar unit. An output of the directional coupler 144 is connected to the radiation antenna 120b of the radar unit 120.

The carrier generator 138 generates a carrier signal having a given frequency, and supplies this signal to the frequency modulation circuit 140.

The modulation voltage generator 142 generates a modulation signal whose amplitude is varied in a triangular form, and supplies this signal to the frequency modulation circuit 140.

The frequency modulation circuit 140 performs a frequency modulation of the carrier signal output from the carrier generator 138 in accordance with the triangular-form modulation signal output from the modulation voltage generator 142. Thus, a modulated signal is generated at an output of the frequency modulation circuit 140.

Figures 14A, 14B:
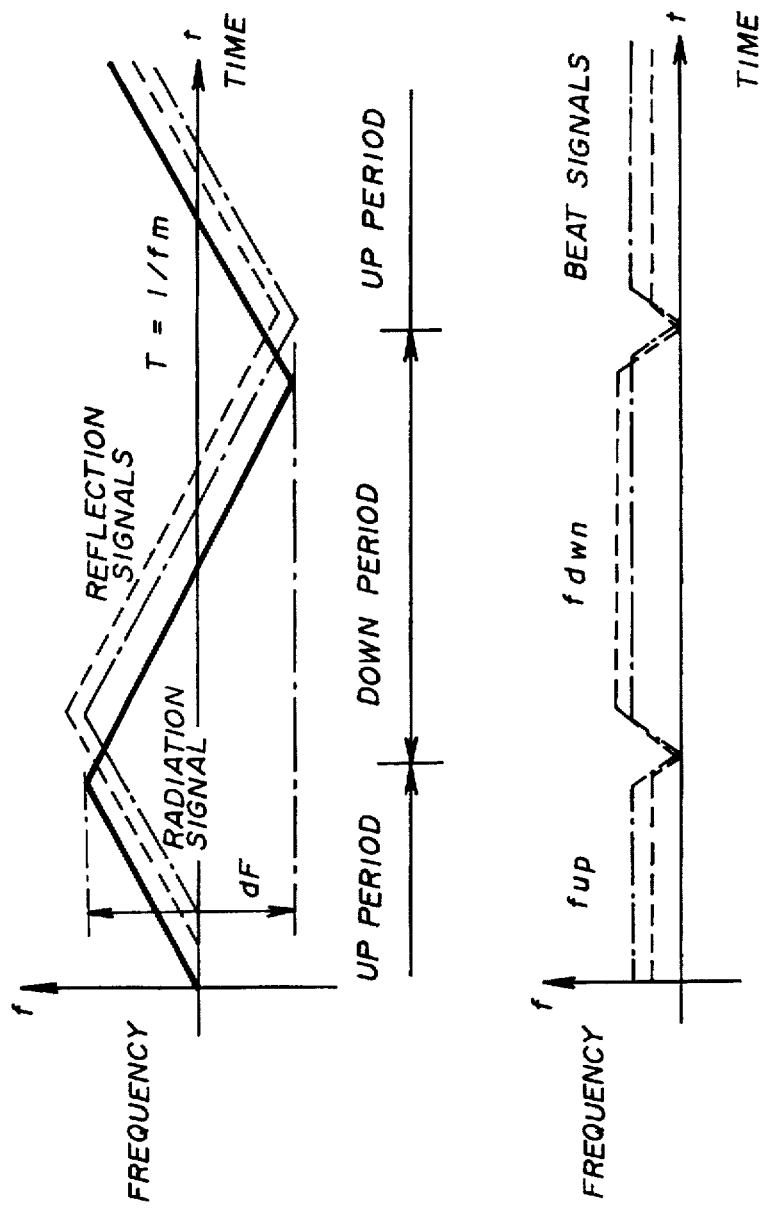
FIG. 14A is a diagram showing waveforms of radiation and reflection signals of the radar signal processing part in FIG. 13.
FIG. 14B is a diagram showing waveforms of beat signals of the radar signal processing part in FIG. 13.

FIG. 14A shows waveforms of radiation and reflection signals of the radar signal processing part 134 in FIG. 13. The waveform of the radiation signal indicated by a solid line in FIG. 14A shows a change in the frequency of the modulated signal at the output of the frequency modulation circuit 140. At a result of the above-mentioned frequency modulation, the modulated signal is generated at the output of the frequency modulation circuit 140.

As shown in FIG. 14A, the frequency of this modulated signal (the radiation signal) is varied in a triangular form. A frequency change width of the radiation signal is indicated by "dF", and a modulation frequency of the radiation signal is indicated by "fm" (fm=1/T where T is a period of the amplitude change of the signal output by the modulation voltage generator 142). The modulated signal output from the frequency modulation circuit 140 is supplied to the radiation antenna 120b via the directional coupler 144, and this signal is supplied to a mixer 146 (which will be described later) via the directional coupler 144.

The radiation signal (the above modulated signal) supplied to the radiation antenna 120b is radiated as the radiation beams by the radar unit 120 to a target in a forward direction of the vehicle in accordance with the scanning angle signal (θ). When there is the target in the forward direction of the vehicle, reflection signals which are reflection beams after the radiation beam has been reflected off the target are received at the receiving antenna 120c of the radar unit 120.

The receiving antenna 120c is connected to an input of the mixer 146. The radar signal processing part 134 comprises the mixer 146, an amplifier 148, a filter 150, and a fast-Fourier-transform (FFT) circuit 152. These elements and the radar unit 120 constitute a beam receiving portion of the FMCW radar unit. In response to the reflection signals supplied from the receiving antenna 120c, the radar signal processing part 134 generates the data of the relative distance and the relative velocity related to the target, through the radar signal processing.

The waveforms of reflection signals indicated by a dotted line and a one-dot chain line in FIG. 14A show changes of the frequencies of the reflection signals supplied from the receiving antenna 120c to the mixer 146.

The mixer 146 performs a mixing of the radiation signal from the directional coupler 144 and the reflection signals from the receiving antenna 120c, and generates beat signals at an output of the mixer 146 as a result of the mixing. Changes of the frequencies of the beat signals at the output of the mixer 146 are in accordance with the differences between the radiation signal frequency and the reflection signal frequencies.

FIG. 14B shows waveforms of the beat signals generated in the radar signal processing part 134 in FIG. 13. Hereinafter, as shown in FIGS. 14A and 14B, a frequency of a beat signal generated at an "up period" during which the frequency of the radiation signal is increasing is called an up-frequency "fup", and a frequency of a beat signal generated at a "down period" during which the frequency of the radiation signal is decreasing is called a down-frequency "fdwn".

The beat signals generated at the output of the mixer 146 are supplied to the filter 150 after they have been amplified by the amplifier 148. The beat signals from the amplifier 148 are separated by the filter 150 into the beat signals of the up periods and the beat signals of the down periods. These beat signals at the output of the filter 150 are separately supplied to the FFT circuit 152.

Thus, the FFT circuit 152 determines a power spectrum of the up-frequency for the beat signals of the up periods through the fast Fourier transform, and determines a power spectrum of the down-frequency for the beat signals of the down periods through the fast Fourier transform.

FIG. 15A shows the spectrum level of the up-frequency determined by the FFT circuit 152 for the beat signals of the up periods when two targets in the scanning range of the radar unit 120 are detected. FIG. 15B shows the spectrum level of the down-frequency determined by the FFT circuit 152 for the beat signals of the down periods in the same case.

In a case in which there are a plurality of targets in the scanning range of the radar unit 120, different reflection signals from the individual targets are received at the receiving antenna 120c. Different beat signals for the respective reflection signals of the targets are generated at the output of the mixer 146. Consequently, the spectrum level of the up-frequency determined by the FFT circuit 152 has a plurality of peaks, such as "FMu1" and "FMu2" in FIG. 15A, and the spectrum level of the down-frequency determined by the FFT circuit 152 has a plurality of peaks, such as "FMd1" and "FMd2" in FIG. 15B.

Generally, there is a phase difference between the radiation signal output by the radiation antenna 120b and the reflection signal received by the receiving antenna 120c, and this phase difference is proportional to the time for the signals to be transmitted over the distance between the vehicle and the target.

When the relative velocity of the target is zero (the speed of the target is equal to the vehicle speed of the vehicle), no Doppler shift of the frequency of the reflection signal takes place. The waveform of the reflection signal in this case which shows the change of the frequency of the reflection signal supplied to the mixer 146 is as indicated by the one-dot chain line in FIG. 14A. As shown, the waveform of the reflection signal in this case (the one-dot chain line) is described by translating the waveform of the radiation signal (the solid line) in a direction parallel to the time axis "t".

Therefore, when the relative velocity of the target is zero, the up-frequency fup of the beat signal is the same as the down-frequency fdwn of the beat signal (fup=fdwn), which is indicated by the one-dot chain line in FIG. 14B. Each value of the up-frequency fup and the down-frequency fdwn in the present case is proportional to the relative distance between the target and the vehicle.

On the other hand, when the relative velocity (Vr) of the target is greater or smaller than zero (the target moves away from the vehicle or the vehicle approaches the target), a Doppler shift of the frequency of the reflection signal proportional to the relative velocity Vr takes place. For example, when the relative velocity Vr is smaller than zero, the frequency of the reflection signal in this case is shifted to a frequency higher than the frequency of the radiation signal due to the Doppler shift.

Since the Doppler shift occurs in the present case, the waveform of the reflection signal which shows the change of the frequency of the reflection signal supplied to the mixer 146 is that indicated by the dotted line in FIG. 14A. As shown, the waveform of the reflection signal in this case (the dotted line) is described by translating the waveform of the radiation signal (the solid line) both in a direction parallel to the time axis "t" and in a direction parallel to the frequency axis "f".

When the relative velocity Vr is smaller than zero and the frequency of the reflection signal is shifted to the higher frequency as in FIG. 14A, the up-frequency fup of the beat signal is reduced and the down-frequency fdwn of the beat signal is enlarged, which is indicated by the dotted line in FIG. 14B. Each value of the up-frequency fup and the down-frequency fdwn in the present case contains a Doppler shift component which is superimposed in the beat signal.

In the present case, an average of the up-frequency and the down-frequency is determined by $$fr=(fup+fdwn)/2 \quad (1)$$

By obtaining the average fr by the above Equation (1), the Doppler shift components of the up-frequency fup and the down-frequency fdwn in the average fr are canceled by each other. It is possible to obtain the average fr of the up-frequency and the down-frequency which is proportional to the relative distance between the target and the vehicle since it contains no Doppler shift component.

Further, in the present case, a value fd of ½ of a difference between the up-frequency fup and the down-frequency fdwn is determined by $$fd=(fdwn-fup)/2 \quad (2)$$

By obtaining the value fd by the above Equation (2), an average of the sum of the Doppler shift components of the up-frequency fup and the down-frequency fdwn is determined. It is possible to obtain the value fd which is equivalent to the Doppler shift component of each of the up-frequency and the down-frequency due to the relative velocity of the target.

In the present embodiment, the following relationships are met, supposing that a target in the scanning range of the radar unit 120 is detected, the relative distance of the target being indicated by L, and the relative velocity of the target being indicated by Vr.

$$fr=4fm \cdot dF \cdot L/c \quad (3)$$

$$fd=2Vr \cdot fo/c \quad (4)$$

where fo is a central frequency of the modulation signal output by the modulation voltage generator 142, fm is a frequency of the modulated signal output by the frequency modulation circuit 140, dF is the frequency change width of the modulated signal, and c is the travel speed of the electromagnetic wave.

Therefore, if the peaks of the spectrum levels of the up-frequency and the down-frequency of the beat signals are determined by the FFT circuit 152, the values of the "fr" and the "fd" can be obtained by using the above Equations (1) and (2). Further, the values of the relative distance L and the relative velocity Vr related to the target can be obtained by substituting the values of the "fr" and the "fd" into the above Equations (3) and (4).

As described above, the moving mechanism 124 is feedback-controlled by the scanning controller 122 to move the beam radiation axis of the radar unit 120, so that the scanning angle of the radar unit 120 is adjusted to be in accordance with the scanning angle signal (θ) output from the radar control unit 110.

Figure 16:
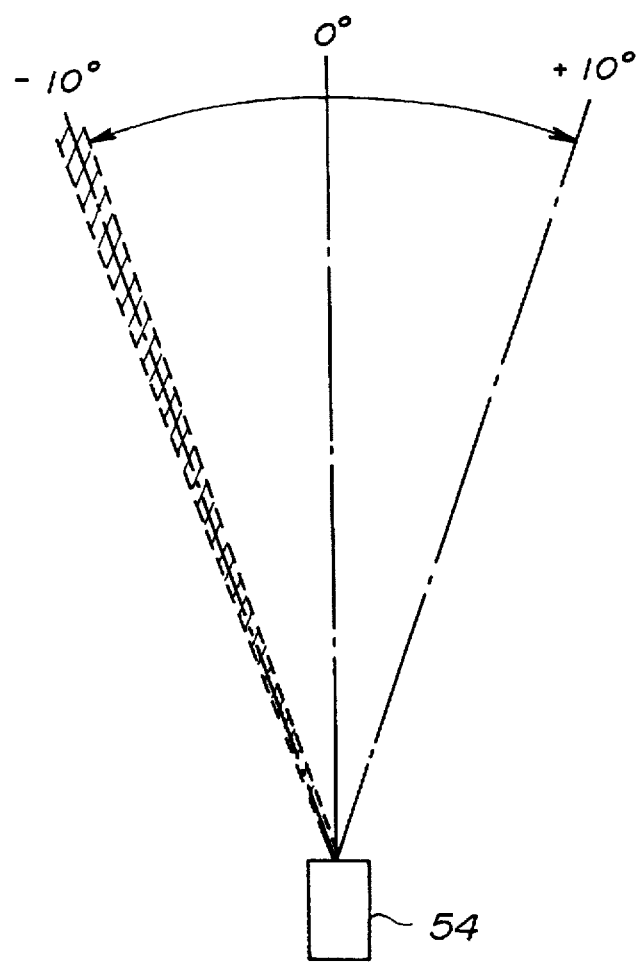
FIG. 16 is a diagram showing a range of a beam scanning of the radar unit in FIG. 11.

FIG. 16 shows a range of the beam scanning of the radar unit 120, which is predetermined on a vehicle 54 in which the radar apparatus of the present embodiment in FIG. 11 is incorporated.

Referring to FIG. 16, when the beam scanning of the radar unit 120 to the target is performed, the radiation beam of the radar unit 120 is moved by the scanning controller 122 across the target from the left to the right or vice versa on the plane of the horizontal forward running direction of the vehicle 54. As described above, the scanning angle (θ) of the radar unit 120 is the angle between the direction of the beam radiation axis of the radar unit 120 and the horizontal forward running direction of the vehicle 54. As shown in FIG. 16, the scanning angle (θ) is changed from −10° to +10° or vice versa during the beam scanning of the radar unit 120, and the horizontal forward running direction of the vehicle 54 accords with the direction of the scanning angle 0°. The scanning angle θ is negative (or smaller than zero) when the radiation beam of the radar unit 120 covers a range on the left side of the target, and the scanning angle θ is positive (or greater than zero) when the radiation beam of the radar unit 120 covers a range on the right side of the target.

Figure 17:
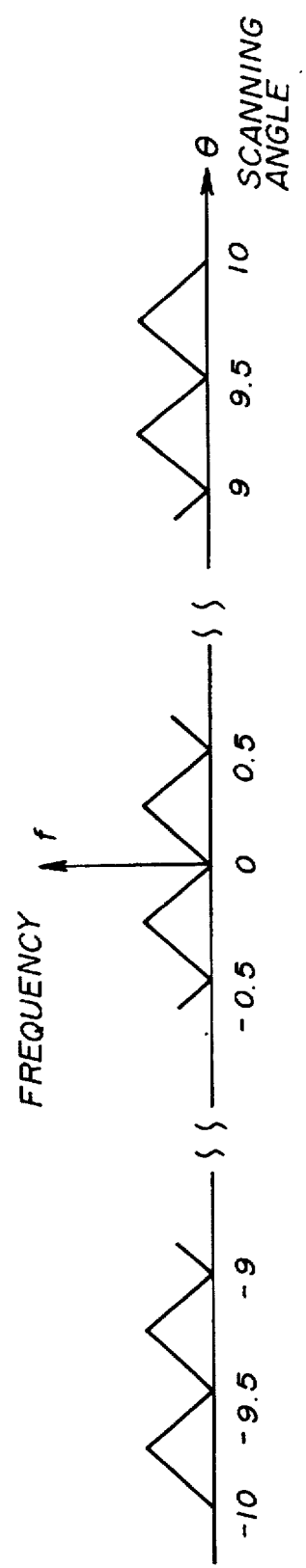
FIG. 17 is a diagram showing a relationship between a frequency of a radiation signal and a scanning angle of the radar unit in FIG. 11.

FIG. 17 shows a relationship between the frequency f of the radiation signal and the scanning angle θ of the radar unit 120 in FIG. 11. As described above, the scanning angle θ supplied by the scanning angle determining part 132 is changed in synchronism with the control timing of the radar signal processing part 134.

More specifically, in the radar apparatus of the present embodiment, the scanning angle θ is changed by 0.5° when the frequency f of the radiation signal is changed for one period. In addition, in the radar apparatus of the present embodiment, the beam scanning of the radar unit 120 during which the scanning angle θ is changed from −10° to +10° or vice versa is repetitively performed for every 100 milliseconds (msec).

In the radar control unit 110 of the present embodiment, the calculations of the values of the "fr" and the "fd" using the above Equations (1) and (2) and the calculations of the values of the relative distance L and the relative velocity Vr related to the target by using the values of the "fr" and the "fd" and the above Equations (3) and (4) are repetitively carried out each time the scanning angle θ is changed by 0.5° for every 2.5 msec. Also, the beam scanning of the radar unit 120 is repetitively carried out through the scanning controller 122 each time the scanning angle θ is changed by 0.5°.

Accordingly, in the present embodiment, the range of the beam scanning of the radar unit 120 in FIG. 16 (in which the scanning angle θ is changed from −10° to +10°) is divided into forty subsections, the calculated values of the "fr" and the "fd" and the calculated values of the relative distance L and the relative velocity Vr related to the target are obtained for each subsection (corresponding to 2.5 msec) of the beam scanning of the radar unit 120. Thus, in the present embodiment, for every 100 msec during which the beam scanning of the radar unit 120 to the target is completed, forty sets of the peaks of the spectrum levels of the up-frequency and the down-frequency (as in FIGS. 15A and 15B), corresponding to respective forty scanning angles θ, are determined by the FFT circuit 152, and forty sets of the calculated values of the "fr" and the "fd" and the calculated values of the relative distance L and the relative velocity Vr related to the target, corresponding to the respective forty sets of the peaks, are obtained by the radar signal processing part 134. These calculated values which are related to the respective scanning angles θ are supplied from the radar signal processing part 134 to the target recognition part 136.

Figure 18:
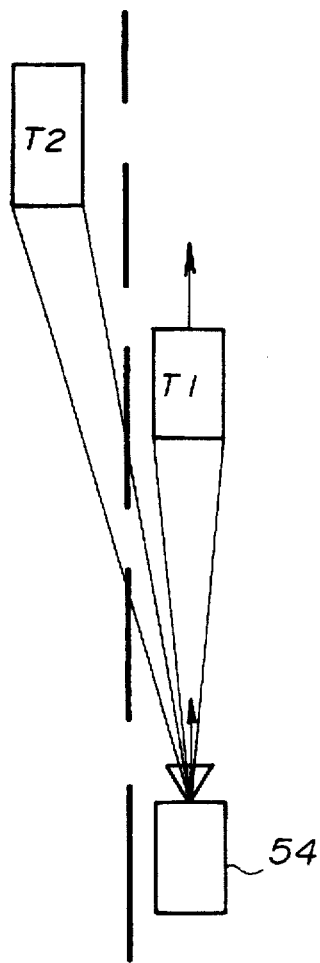
FIG. 18 is a diagram showing a case in which two targets are separately running with a distance along a straight path in a forward direction of the vehicle.

FIG. 18 shows a case in which two targets T1 and T2 (which are advancing vehicles) are separately running with a distance along a straight path in a forward direction of the vehicle 54. In FIG. 18, the target T1 is running forwardly in a roadway lane which is the same as a roadway lane of the vehicle 54. The target T2 is running forwardly in a roadway lane which is different from and adjacent to the roadway lane of the vehicle 54, and the target T2 is advancing forward from the target T1.

Figure 19:
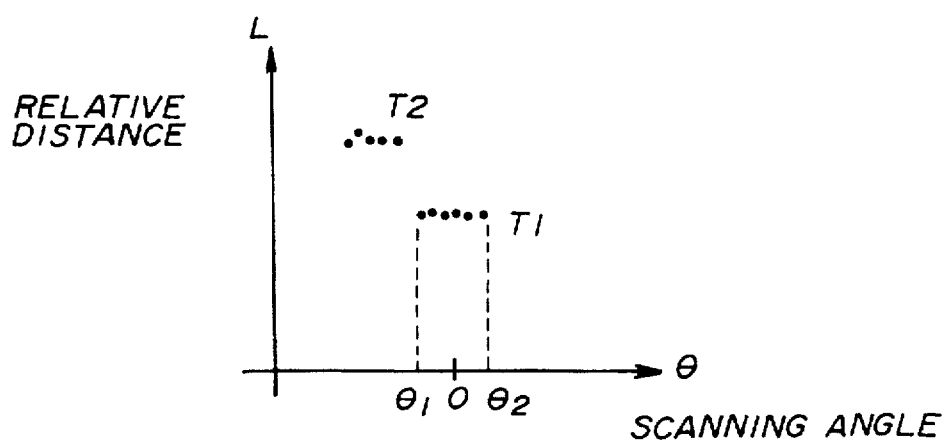
FIG. 19 is a diagram showing data of received reflection signals in the case of FIG. 18.

FIG. 19 shows data of received reflection signals at the input of the target recognition part 136 of the radar apparatus on the vehicle 54, in the case of FIG. 18. The data of the received reflection signals in FIG. 19 includes a plurality of plots of the relationship between the scanning angle (θ) and the relative distance (L) related to each of the target T1 and the target T2.

As shown in FIG. 19, a group of plots of the data of the received reflection signals related to the target T2 gathers in an area in which the relative distance L is large. A different group of plots of the data of the received reflection signals related to the target T1 gathers in a separate area in which the relative distance L is small. In the present case, as shown in FIG. 19, it is possible to easily distinguish the group of the plots related to the target T2 and the group of the plots related to the target T1 with respect to each of the relative distance L and the relative velocity Vr.

Figure 20:
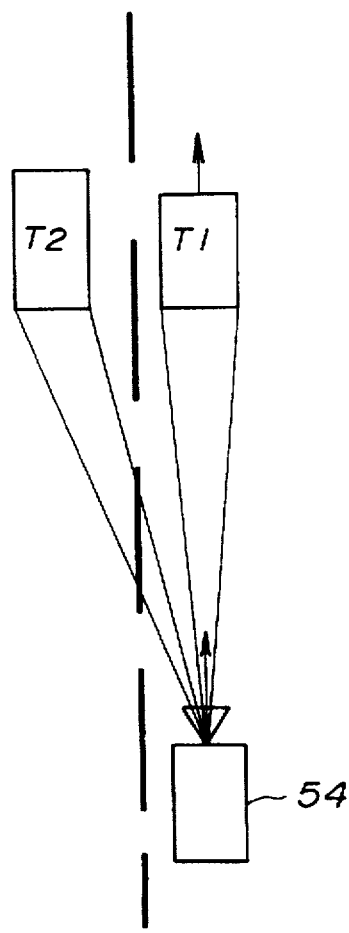
FIG. 20 is a diagram showing a case in which two adjacent targets are running in parallel in a forward direction of the vehicle.

FIG. 20 shows a case in which two adjacent targets T1 and T2 (which are advancing vehicles) are running in parallel along a straight path in the forward direction of the vehicle 54. There is no substantial distance between the target T1 and the target T2 along the straight path. In FIG. 20, the target T1 is running forwardly in the roadway lane which is the same as the roadway lane of the vehicle 54. The target T2 is running forwardly in the adjacent roadway lane which is different from to the roadway lane of the vehicle 54. In the present case, the target T1 and the target T2 are advancing in parallel forward from the vehicle 54.

Figure 21:
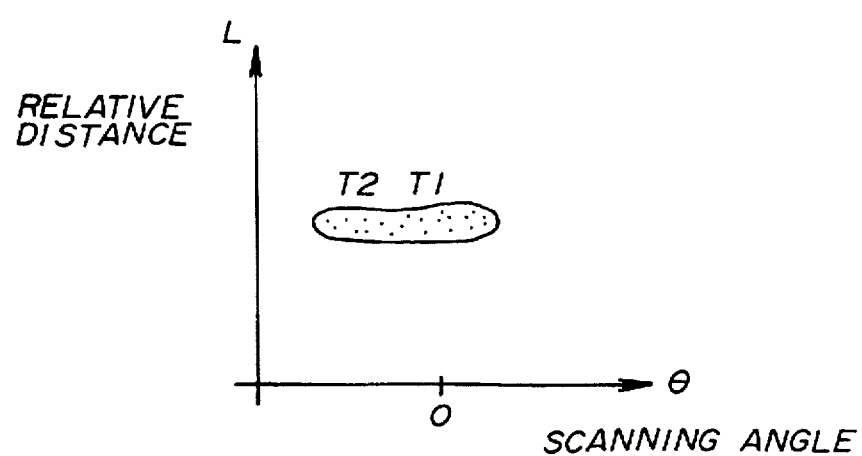
FIG. 21 is a diagram showing data of received reflection beams in the case of FIG. 20.

FIG. 21 shows data of received reflection beams at the input of the target recognition part 136 of the radar apparatus on the vehicle 54, in the case of FIG. 20. The data of the received reflection signals in FIG. 21 includes a plurality of plots of the relationship between the scanning angle (θ) and the relative distance (L) related to both the target T1 and the target T2.

As shown in FIG. 21, a group of plots of the data of the received reflection signals related to the target T2 and a group of plots of the data of the received reflection signals related to the target T1 gather in a single area in which the respective relative distances L are substantially the same. In the present case, as shown in FIG. 21, it is difficult to distinguish the group of the plots related to the target T2 and the group of the plots related to the target T1 with respect to each of the relative distance L and the relative velocity Vr.

The radar apparatus of the present embodiment is characterized by the target recognition part 136 which allows the radar control unit 110 to easily distinguish the group of the recognition data related to the target T2 and the group of the recognition data related to the target T1 with respect to each of the relative distance L and the relative velocity Vr, even in the case of FIGS. 20 and 21.

Figure 22:
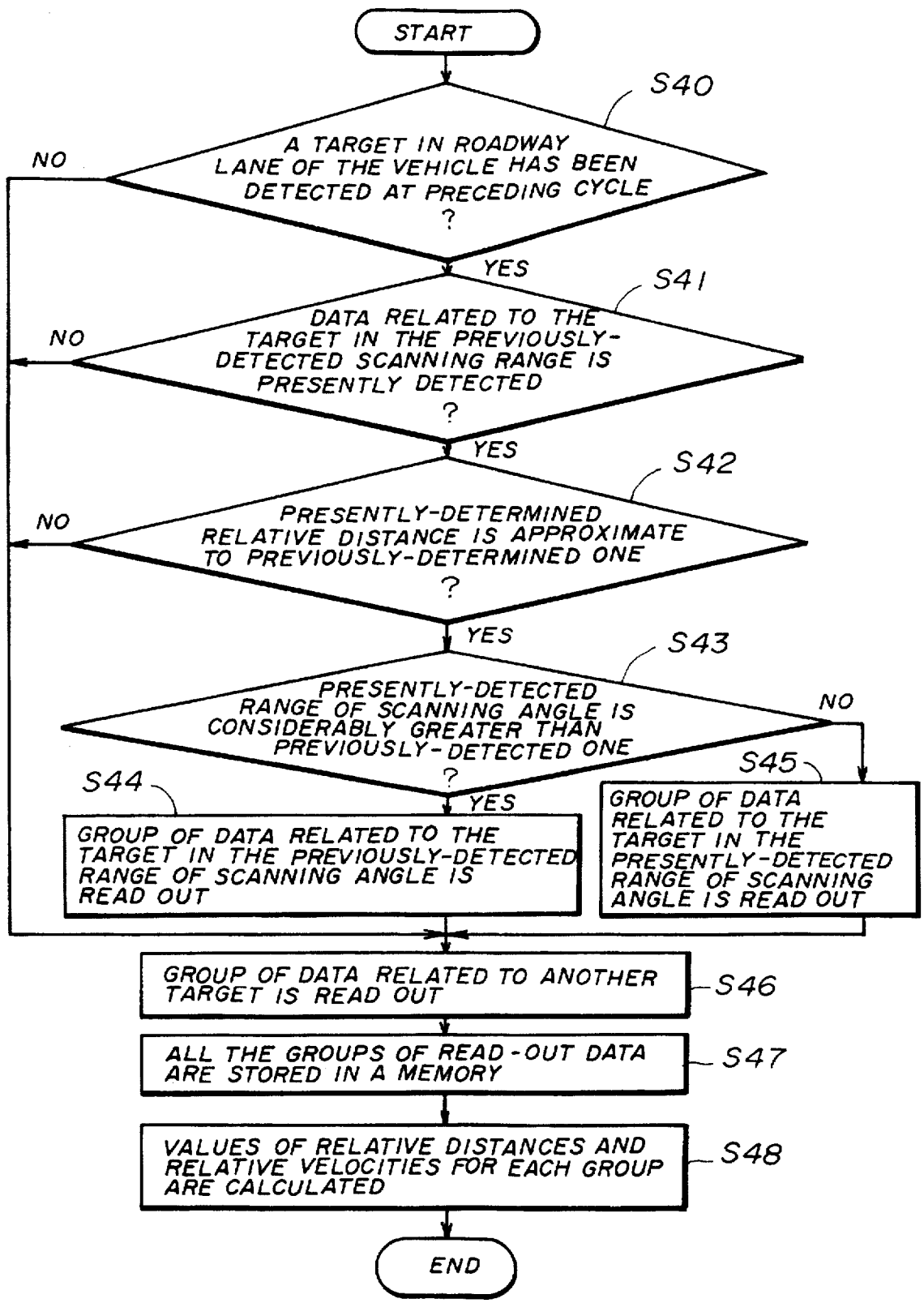
FIG. 22 is a flowchart for explaining a control procedure performed by the radar apparatus in FIG. 11.

FIG. 22 shows a control procedure performed by the target recognition part 136 of the radar control unit (ECU) 110 in FIG. 12. This control procedure is performed in order to achieve the above-mentioned function of the target recognition part 136. The control procedure in FIG. 22 is started for every 100 msec needed for one beam scanning of the radar unit 120 to be performed by changing the scanning angle θ from −10° to +10° or vice versa.

When the control procedure in FIG. 22 is started, the target recognition part 136 of the ECU 110, at step S40, detects whether a target in the roadway lane which is the same as that of the vehicle 54 has been detected at a preceding cycle of the control procedure.

The radar apparatus of the present embodiment can determine the relative distance L of the target to the vehicle 56 if a target in the scanning range of the radar unit 120 in the forward direction of the vehicle 56 is detected. The determination as to whether the target is in the roadway lane which is the same as that of the vehicle 54 is performed at the step S40 as follows.

Figure 23:
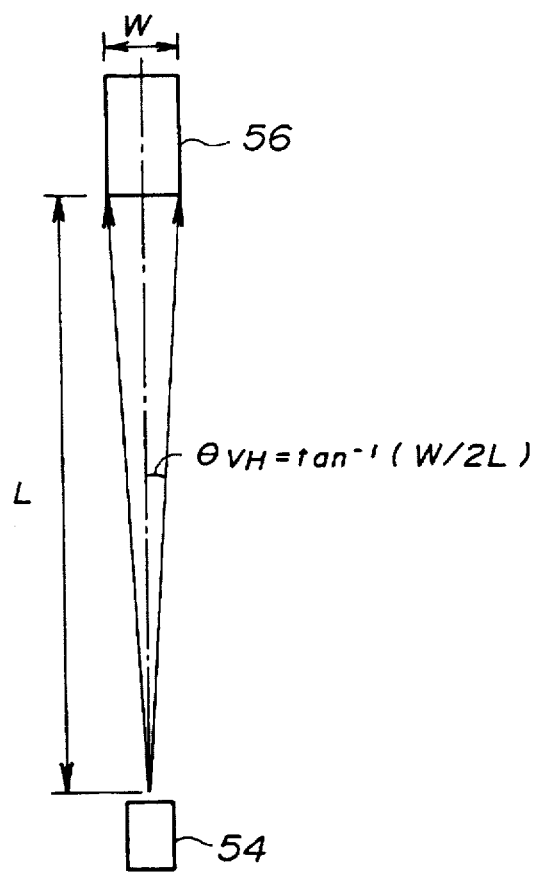
FIG. 23 is a diagram showing a case in which the vehicle and the target are separately running along a straight path with a relative distance between the vehicle and the target.

FIG. 23 shows a scanning range of the radar unit 120 when the vehicle 54 and a target 56 are separately running along a straight path with a relative distance L between the vehicle 54 and the target 56. If the forward direction of the target 56 accords with the forward direction of the vehicle 54, the scanning angle θ of the radar unit 120 meets the following condition:

$$-\tan^{-1}(W/2L) \leq \theta \leq \tan^{-1}(W/2L)$$

where L is the relative distance between the vehicle 54 and the target 56, and W is a width of the target 56.

AS previously described, the value of θvh (which is ½ of the reference range value) corresponds to the beam scanning range of the radar unit 120 for ½ of the width W of the target.

Figure 24:
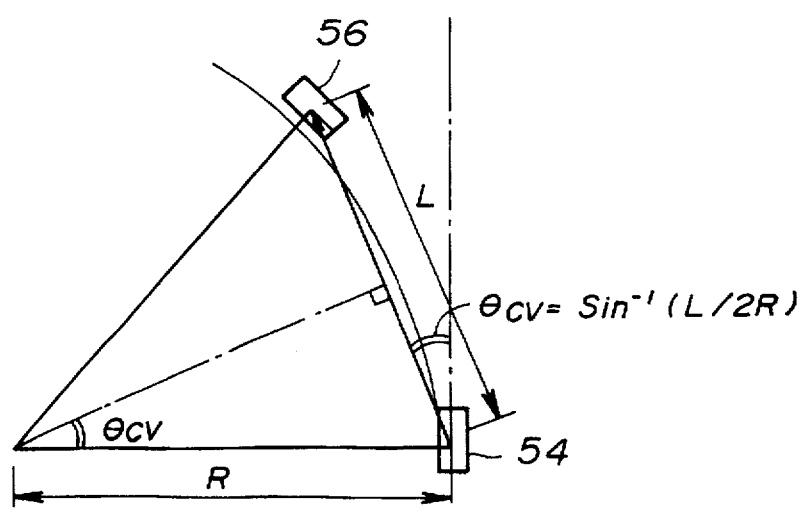
FIG. 24 is a diagram showing a case in which the vehicle and the target are running in the same lane along a curved path.

FIG. 24 shows a case in which the vehicle 54 and the target 56 are running in the same lane along a curved path with a relative distance L between the vehicle 54 and the target 56. A radius R of curvature of the curved path and the relative distance of the target 56 are determined by the radar apparatus of the present embodiment. The determination as to whether the target 56 is in the roadway lane which is the same as that of the vehicle 54 is performed depending on whether the center scanning angle θc of the radar unit 120 for the center of the target 56 meets the following conditions:

$$\theta cv - K \cdot \theta vh < \theta c < \theta cv + K \cdot \theta vh \tag{5}$$

where K is a predetermined coefficient of the radar apparatus.

Referring back to FIG. 22, when the result at the step S40 is affirmative, it is determined that the target 56 in the roadway lane which is the same as that of the vehicle 54 has been detected at the preceding cycle of the control procedure. At this time, step S41 is performed next.

On the other hand, when the result at the step S40 is negative, it is determined that the target 56 in the roadway lane which is the same as that of the vehicle 54 has not been detected at the preceding cycle of the control procedure. At this time, step S46 is performed next, and steps S41 through S45 are not performed.

Step S41 detects whether the recognition data related to the target 56 in the scanning range of the radar unit 120 in which the target 56 has been detected at the preceding cycle is detected at the present cycle.

When no recognition data related to the target 56 in the scanning range of the radar unit 120 is detected at the present cycle (the result at the step S41 is negative), it is determined that the target 56, previously detected to be in the roadway lane of the vehicle 54, has been moved to a different roadway lane. At this time, step S46 is performed next, and steps S42 through S45 are not performed.

When the result at the step S41 is affirmative, it is determined that the recognition data related to the target 56 in the scanning range of the radar unit 120 in which the target 56 has been detected at the preceding cycle is detected at the present cycle. At this time, step S42 is performed next.

Step S42 detects whether the relative distance L of the target 56 presently determined at the present cycle is approximate to the relative distance L of the target 56 previously determined at the preceding cycle. As described above, the control procedure of FIG. 22 is performed for every 100 msec. When the relative distance L of the target 56 presently determined at the present cycle is considerably different from the relative distance L of the target 56 previously determined at the preceding cycle, it is determined that the recognition data of the target 56 presently detected at the present cycle is defective.

Therefore, when the result at the step S42 is negative, it is determined that the recognition data of the target 56 presently detected at the present cycle is defective. At this time, step S46 is performed next, and steps S43 through S45 are not performed.

On the other hand, when the result at the step S42 is affirmative, it is determined that the relative distance L of the target 56 presently determined at the present cycle is correct. At this time, step S43 is performed next. Step S43 detects whether the range of the scanning angle of the radar unit 120 presently detected at the present cycle is considerably greater than the range of the scanning angle of the radar unit 120 previously detected at the preceding cycle.

When the result at the step S43 is affirmative, it is determined that another target has presently moved into or approached a roadway lane adjacent to the roadway lane of the target 56 in the range of the scanning angle of the radar unit 120 previously detected at the preceding cycle. Because of the above change, a group of plots of the data of the received reflection signals related to the other target and a group of plots of the data of the received reflection signals related to the target 56 may gather in a single area in which the relative distances L are substantially the same. At this time, step S44 is performed next.

Step S44 reads out the group of the plots of the data of the received reflection signals related to the target 56 in the range of the scanning angle previously detected preferential to that in the range of the scanning angle presently detected. After the step S44 is performed, step S46 is performed.

On the other hand, when the result at the step S43 is negative, it is determined that the range of the scanning angle presently detected at the present cycle is not considerably greater than the range of the scanning angle previously detected at the preceding cycle. At this time, step S45 is performed next. Step S45 reads out the group of the plots of the data of the received reflection signals in the range of the scanning angle presently detected at the present cycle. After the step S45 is performed, step S46 is performed.

Step S46 reads out the group of the plots of the data of the received reflection signals related to another target which is detected to be in another roadway lane which is different from the roadway lane of the vehicle 54.

After the step S46 is performed, step S47 is performed. Step S47 stores all the groups of the plots of the read-out data of the received reflection signals in a memory of the target recognition part 136 of the radar control unit (ECU) 110.

After the step S47 is performed, step S48 is performed. Step S48 calculates the values of the relative distances L and the relative velocities Vr related to the targets from the stored data for each of the groups of the plots.

In the above-described embodiment, it is possible to accurately detect individual targets in a forward direction of the vehicle by separately processing the data of received reflection signals related to one target from the data related to another even when two or more targets are adjacent to each other and running in parallel in the forward direction of the vehicle.

Figure 25:
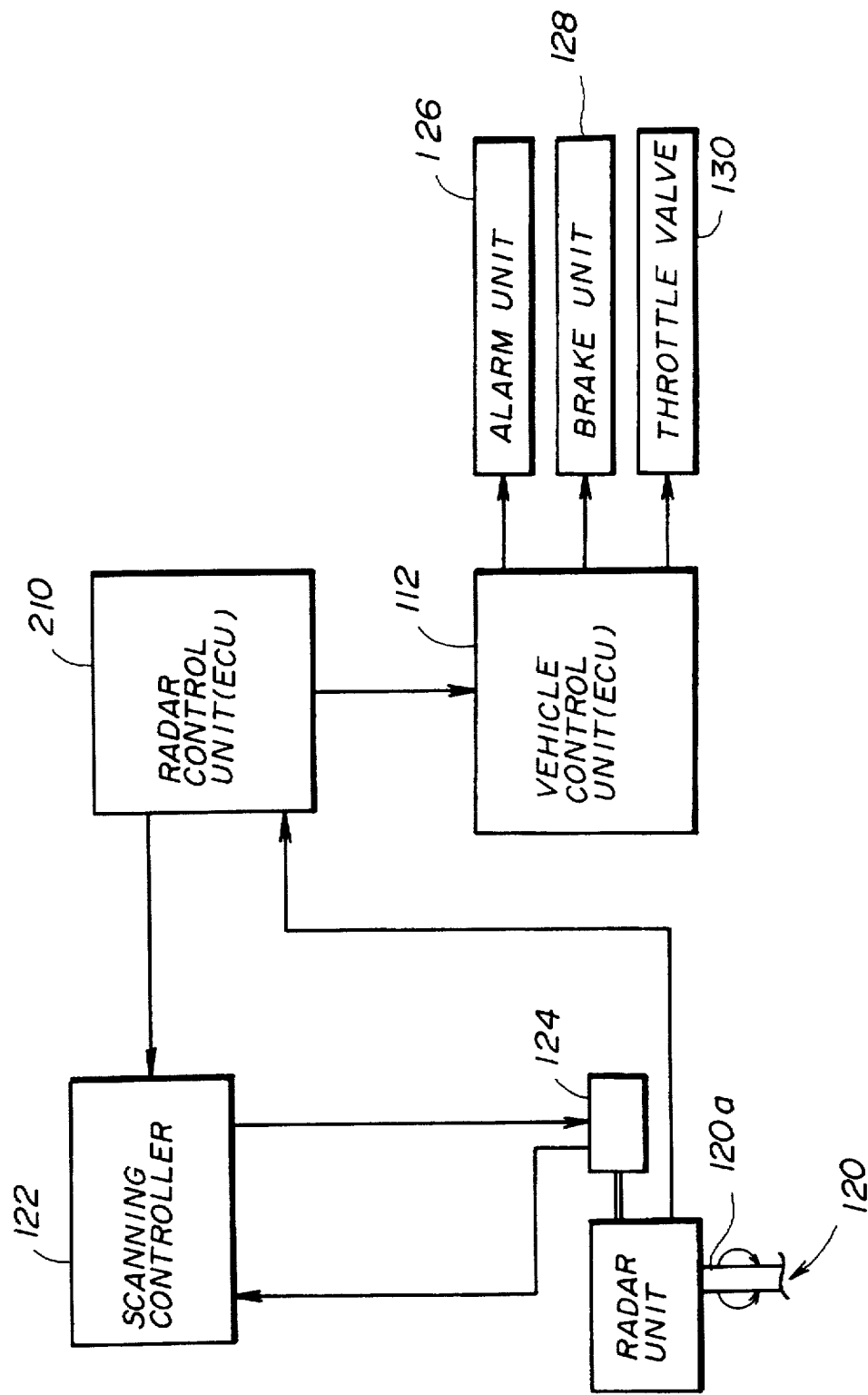
FIG. 25 is a block diagram of a radar apparatus in a further embodiment of the present invention.

Next, FIG. 25 shows a radar apparatus in a further embodiment of the present invention. In FIG. 25, the elements which are the same as corresponding elements in FIG. 11 are designated by the same reference numerals, and a description thereof will be omitted.

Referring to FIG. 25, the radar apparatus of the present embodiment includes a radar control unit 210 which is an electronic control unit (ECU) for controlling the radar apparatus including the scanning controller 122 and the radar unit 120. This radar apparatus is installed on an automotive vehicle.

The radar control unit 210 of the present embodiment has a construction which is essentially the same as the construction of the radar control unit 110 shown in FIG. 12. This radar control unit 210 comprises the scanning angle determining part 132, the radar signal processing part 134 and the target recognition part 136 which are the same as those of the radar control unit 110 previously described with reference to FIG. 12.

The results of the detection of targets from the radar control unit 210 are supplied to the vehicle control unit (ECU) 112. Similarly to the vehicle control unit 112 in FIG. 11, the alarm unit 126, the brake unit 128 and the throttle valve 130 are connected to outputs of the vehicle control unit 112 of the present embodiment. These units provide a warning of a dangerous condition to a vehicle operator and decelerates the vehicle for safety.

The radar apparatus of the present embodiment is characterized by the radar control unit 210 which carries out a control procedure. This control procedure will be described later.

The radar signal processing part 134 of the present embodiment has a construction which is essentially the same as that of the radar signal processing part 134 shown in FIG. 13. This radar signal processing part 134 comprises the carrier generator 136, the frequency modulation circuit 140, the modulation voltage generator 142, the directional coupler 144, the mixer 146, the amplifier 148, the filter 150 and the FFT circuit 152 which are the same as those of the radar signal processing part 134 previously described with reference to FIG. 13.

In the present embodiment, when the spectrum level peaks of the up-frequency and the down-frequency of the beat signals as shown in FIGS. 15A and 15B are determined by the FFT circuit 152 of the radar control unit 210, a pairing of the peaks FMu1 and FMd1 is performed so that the values of the relative distance L and the relative velocity Vr related to one target can be obtained by using the above Equations (1)–(4). Further, a pairing of the peaks FMu2 and FMd2 is performed, and the values of the relative distance L and the relative velocity Vr related to another target can be obtained by using the above Equations (1)–(4).

As previously described with reference to FIGS. 16 and 17, in the present embodiment, the entire range of the beam scanning of the radar unit 120 in FIG. 16 is divided into forty subsections, the calculated values of the relative distance L and the relative velocity Vr related to one target are obtained for each subsection (corresponding to 2.5 msec). In the present embodiment, for every 100 msec during which the beam scanning of the radar unit 120 is performed, forty sets of the spectrum level peaks of the up-frequency and the down-frequency, corresponding to respective forty scanning angles θ, are determined by the FFT circuit 152, and forty sets of the calculated values of the relative distance L and the relative velocity Vr related to the target are obtained by the radar signal processing part 134. These calculated values which are related to the respective scanning angles θ are supplied from the radar signal processing part 134 to the target recognition part 136.

Figure 26:
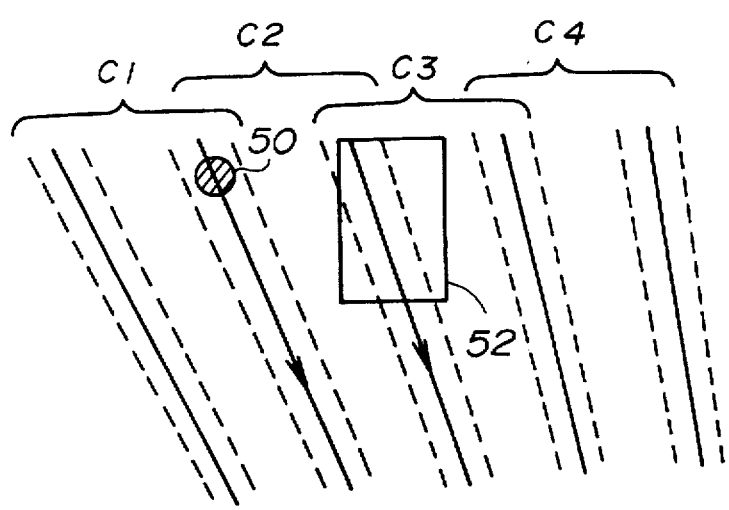
FIG. 26 is a diagram showing a beam scanning of the radar unit to two separate targets in the forward direction of the vehicle.

FIG. 26 shows a beam scanning of the radar unit 120 to two targets 50 and 52 in the forward direction of the vehicle. The target 50 is a fixed pole on a roadway in the forward direction of the vehicle. The target 52 is an advancing vehicle running along the roadway in the forward direction of the vehicle.

As described above, a set of the spectrum level peaks of the up-frequency and the down-frequency is determined for a range of the scanning angle θ corresponding to one subsection is determined. In FIG. 26, boundary lines of each range of the scanning angle for one subsection are indicated by solid lines, and a pair of boundary lines of a width of electromagnetic waves for the beam scanning directed to one subsection are indicated by dotted lines.

In FIG. 26, when the beam radiation axis of the radar unit 120 is moved from the leftmost boundary line to the next boundary line for one subsection (corresponding to a 0.5° change in the scanning angle θ), a range of the beam scanning indicated by "C1" is performed. Further, when the beam radiation axis of the radar unit 120 is moved for a further 0.5° change in the scanning angle θ, adjacent ranges of the beam scanning indicated by "C2", "C3" and "C4" are subsequently performed. These ranges "C1" through "C4" of the beam scanning overlap the adjacent ones. If a target is located near a boundary line between two adjacent ranges of the beam scanning, it is possible that the spectrum level peaks of the up-frequency and the down-frequency related to the same target be determined from each data of the reflection signals detected in the two ranges of the beam scanning.

In the beam scanning of FIG. 26, the target 50 is located near the boundary line between the range C1 and the range C2. The spectrum level peaks related to the target 50 are determined from each of the data of the reflection signals detected in the range C1 and the data of the reflection signals detected in the range C2. Further, the target 52 is located near the boundary line between the range C2 and the range C3, and the spectrum level peaks related to the target 52 are determined from each of the data of the reflection signals detected in the range C2 and the data of the reflection signals detected in the range C3.

Figure 27A:
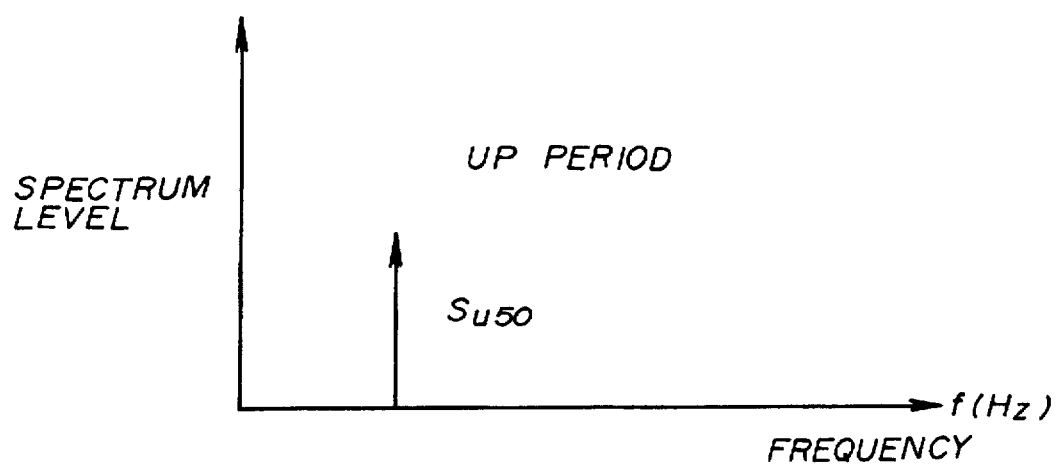
FIGS. 27A and 27B are diagrams showing spectrum levels of an up-frequency and a down-frequency determined for a range of the beam scanning in FIG. 26.
Figure 27B:
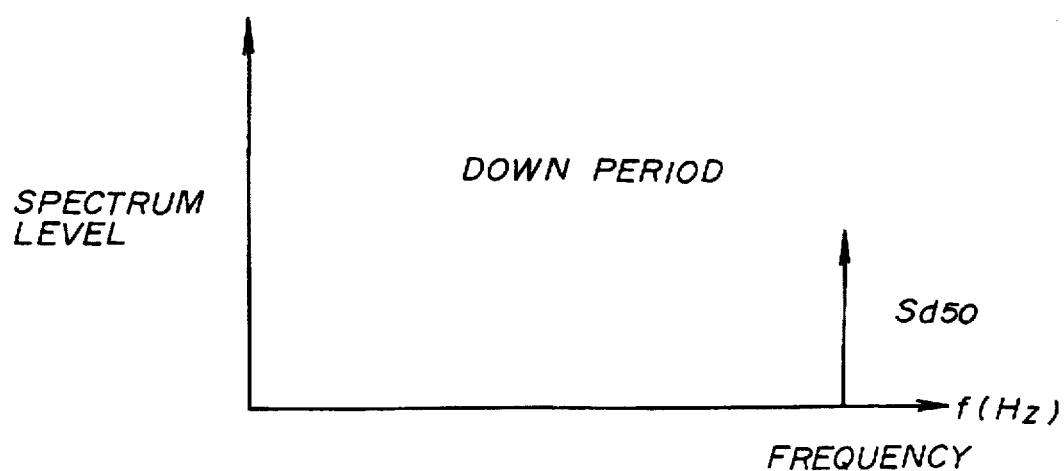

FIGS. 27A and 27B show spectrum levels of the up-frequency and the down-frequency determined for the range "C1" of the beam scanning in FIG. 26. As shown in FIG. 27A, a spectrum level peak "Su50" of the up-frequency related to the target 50 is determined from the data of the reflection signals for the range C1. As shown in FIG. 27B, a spectrum level peak "Sd50" of the down-frequency related to the target 50 is determined from the data of the reflection signals for the range C1. Since the target 50 is the fixed pole, the relative velocity between the vehicle and the target 50 is considerably great. The frequency of the peak Sd50 is considerably separated from the frequency of the peak Su50.

Figure 28A:
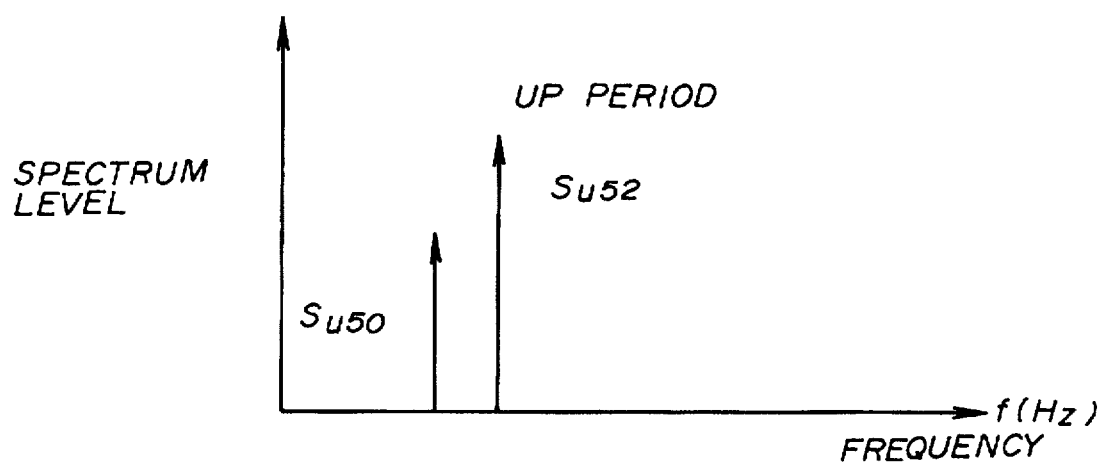
FIGS. 28A and 28B, 29A and 29B, and 30A and 30B are diagrams showing spectrum levels of the up-frequency and the down-frequency determined for other ranges of the beam scanning in FIG. 26.
Figure 28B:
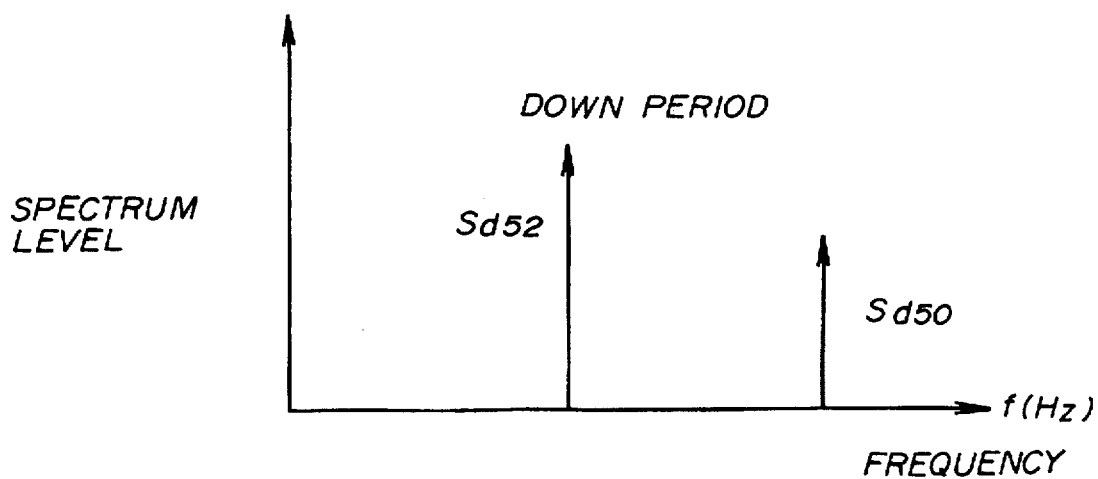

FIGS. 28A and 28B show spectrum levels of the up-frequency and the down-frequency determined for the range "C2" of the beam scanning in FIG. 26. As shown in FIG. 28A, a spectrum level peak "Su52" of the up-frequency related to the target 52 and the spectrum level peak Su50 are determined from the data of the reflection signals for the range C2. As shown in FIG. 28B, a spectrum level peak "Sd52" of the down-frequency related to the target 52 and the spectrum level peak Sd50 are determined from the data of the reflection signals for the range C2. Since the target 52 is running in advance of the vehicle, the relative velocity between the vehicle and the target 52 is not considerably great. The difference between the frequency of the peak Su52 and the frequency of the peak Sd52 is relatively small.

Figure 29A:
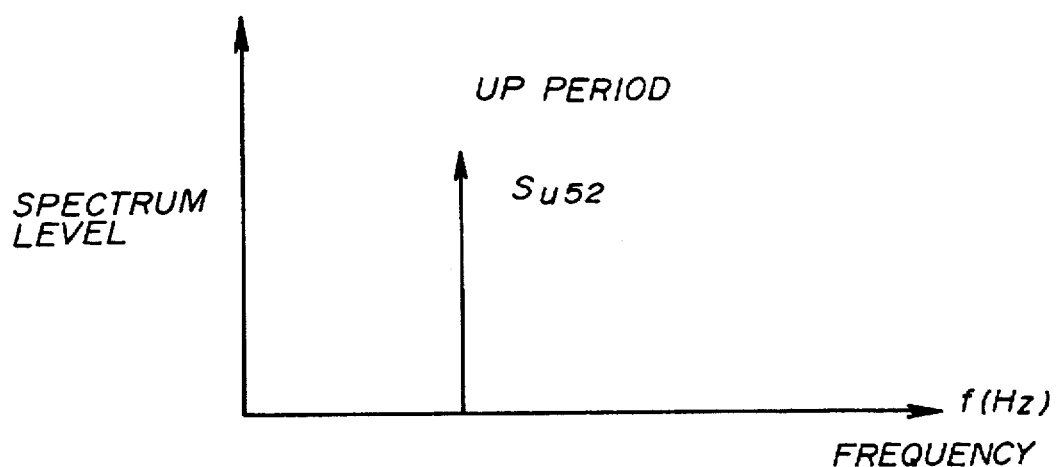
Figure 29B:
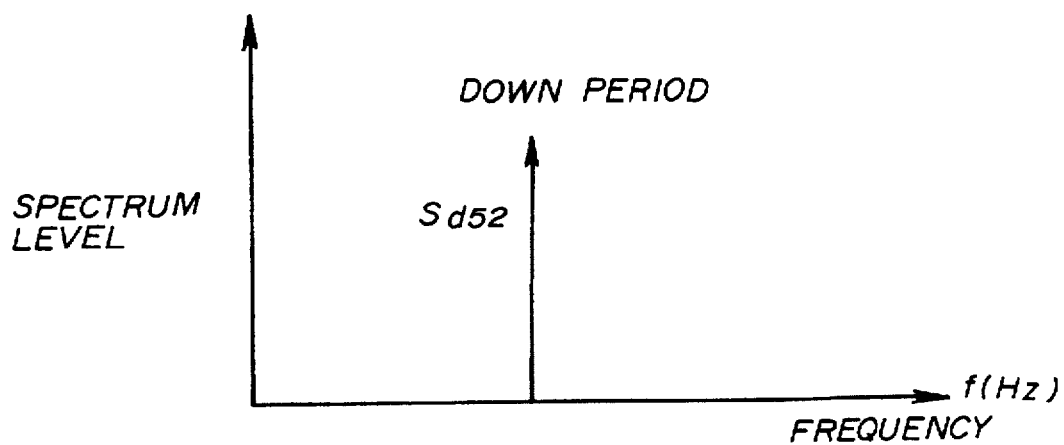

FIGS. 29A and 29B show spectrum levels of the up-frequency and the down-frequency determined for the range "C3" of the beam scanning in FIG. 26. As shown in FIG. 29A, only the spectrum level peak Su52 of the up-frequency is determined from the data of the reflection signals for the range C3. As shown in FIG. 27B, only the spectrum level peak Sd52 of the down-frequency is determined from the data of the reflection signals for the range C3.

Figure 30A:
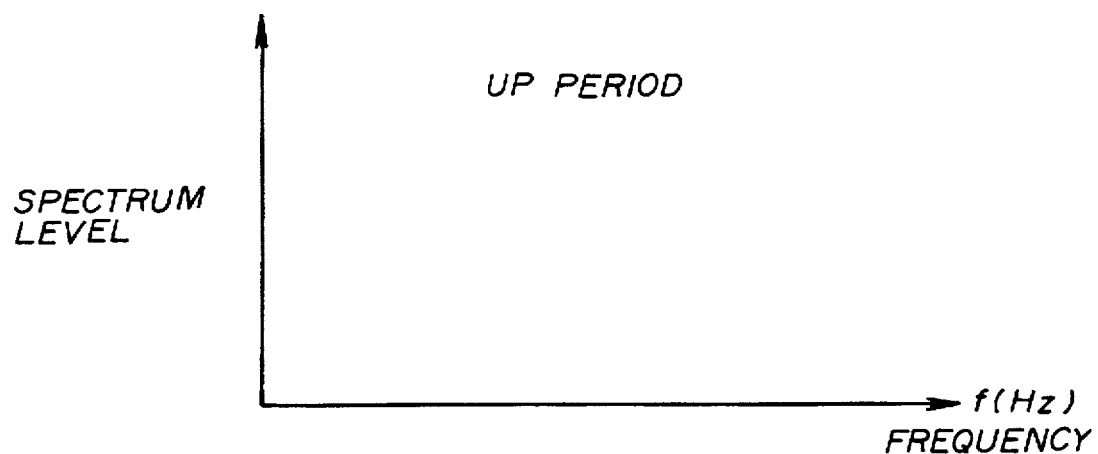
Figure 30B:
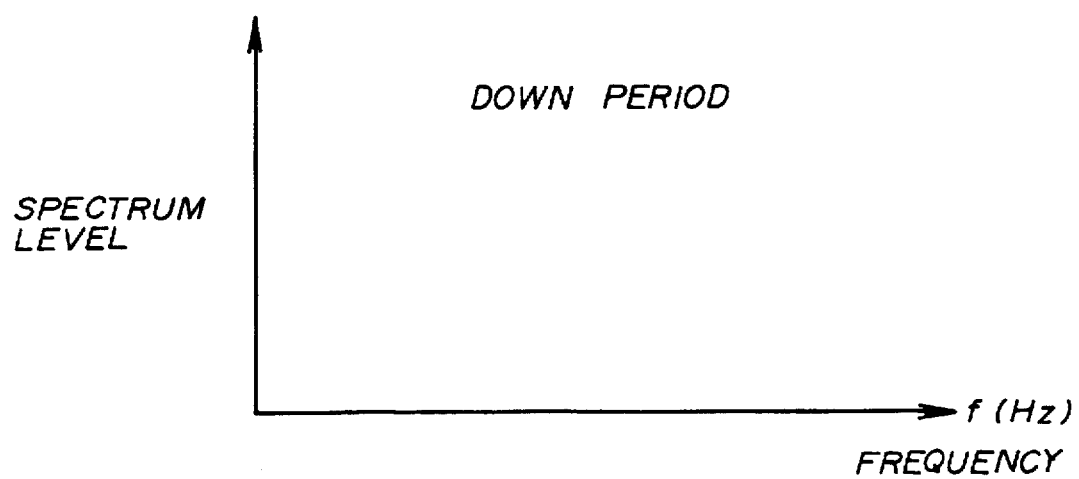

FIGS. 30A and 30B show spectrum levels of the up-frequency and the down-frequency determined for the range "C4" of the beam scanning in FIG. 26. As shown, no spectrum level peak is determined from the data of the reflection signals for the range C4.

When a single set of the spectrum level peaks of the up-frequency and the down-frequency is determined as in the case of FIGS. 27A and 27B or FIGS. 29A and 29B, the values of the relative distance L and the relative velocity Vr related to the target can be easily and accurately calculated by using the above Equations (1)–(4).

However, a plurality of sets of the spectrum level peaks of the up-frequency and the down-frequency related to a plurality of targets are determined as in the case of FIGS. 28A and 29B, it is difficult to accurately calculate the values of the relative distance L and the relative velocity Vr related to each target. In order to easily obtain accurate values of the relative distance L and the relative velocity Vr for each target, it is necessary to suitably perform a pairing of the spectrum level peaks related to the target and a pairing of the spectrum level peaks related to another target.

In the radar control unit 210 of the present embodiment, a pairing of the spectrum level peaks related to one target and a pairing of the spectrum level peaks related to another target are selectively performed based on the data of the scanning angle.

Figure 31A:
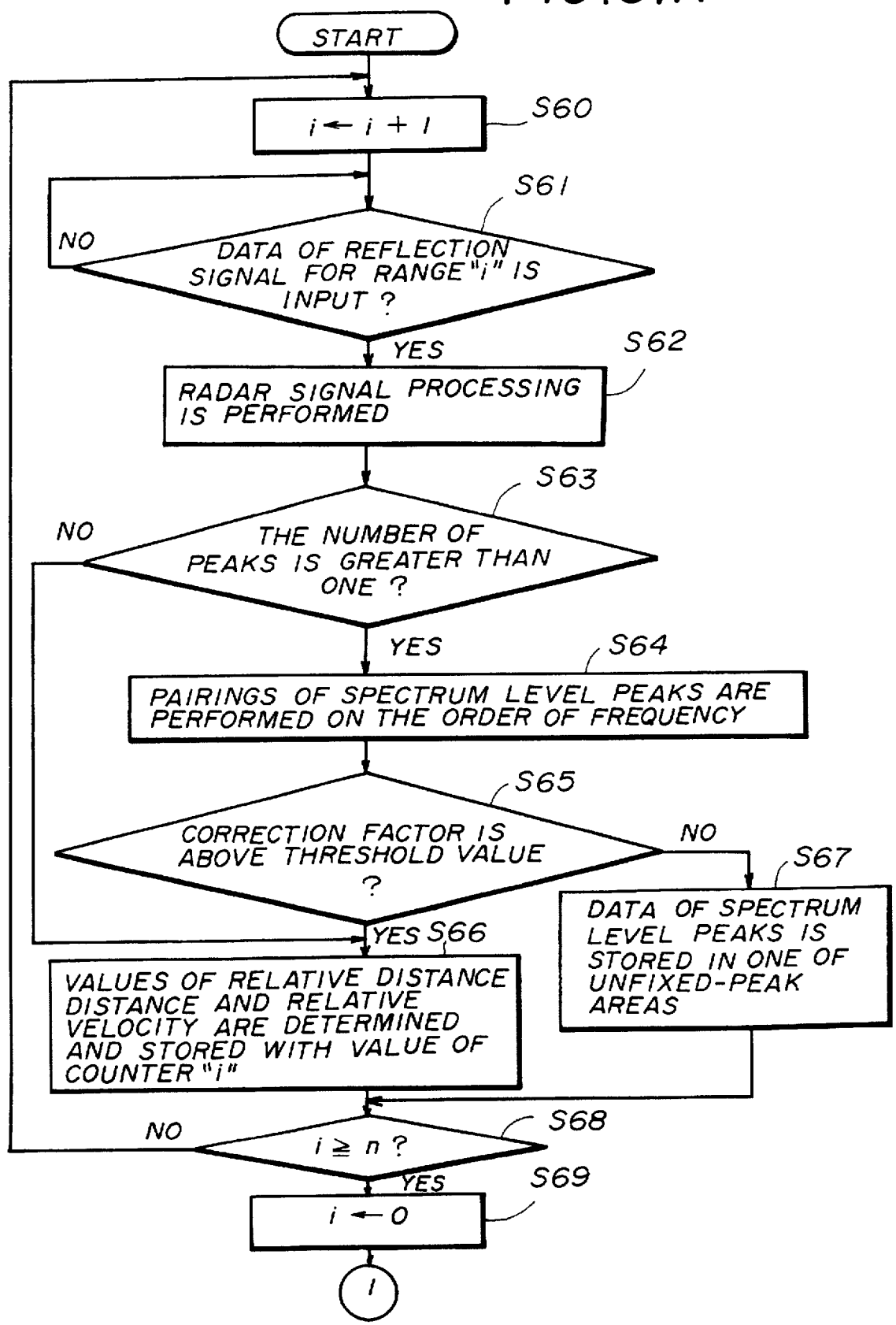
FIGS. 31A and 31B are a flowchart for explaining a control procedure performed by the radar apparatus in FIG. 25.
Figure 31B:
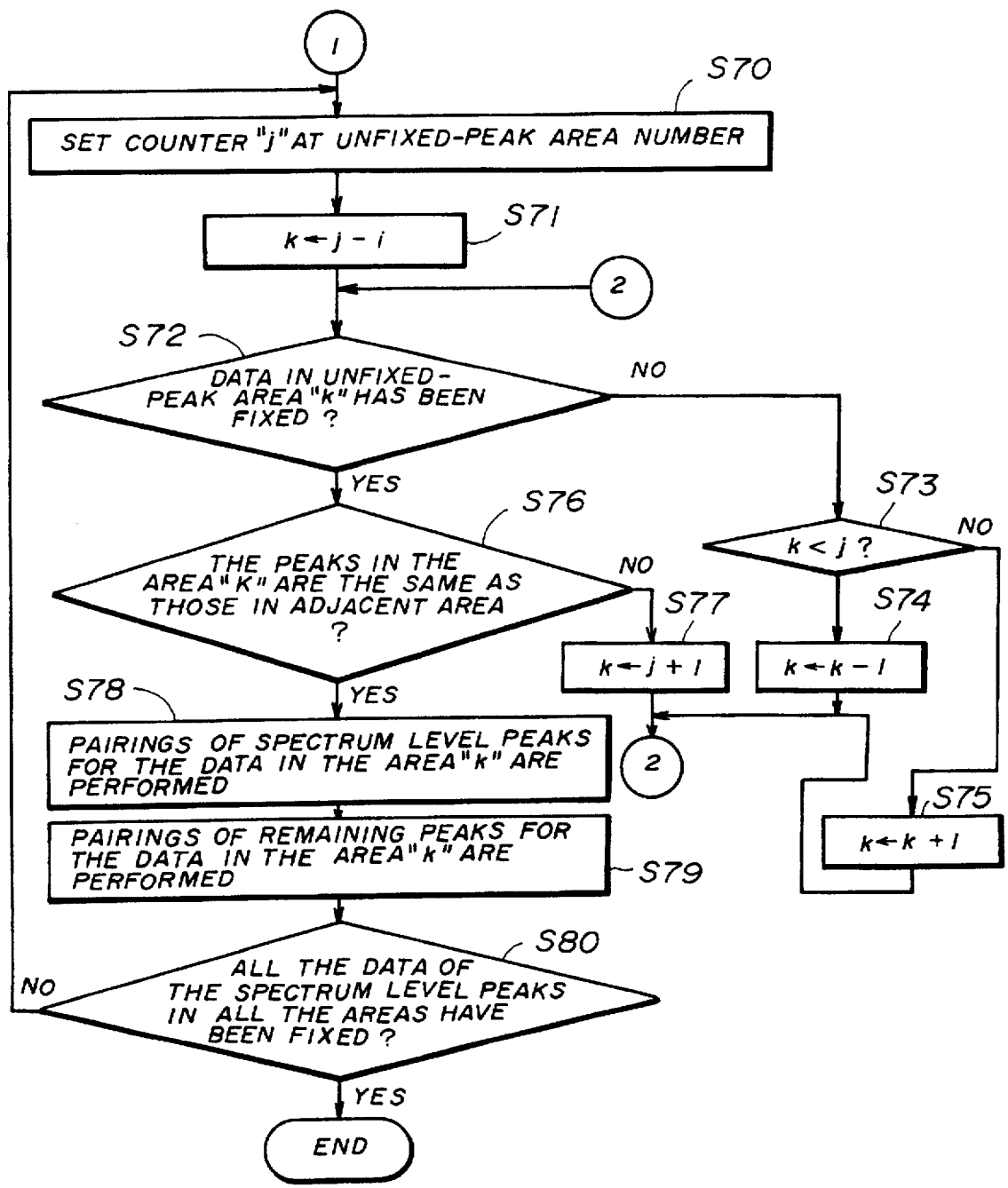

FIGS. 31A and 31B show a control procedure which is performed by the radar control unit 210 of the radar apparatus in FIG. 25. This control procedure is performed in order to achieve the above-mentioned function of the radar control unit 210. The control procedure in FIGS. 31A and 31B is started for every 100 msec needed for one beam scanning of the radar unit 120 to be performed by changing the scanning angle θ from −10° to +10° or vice versa.

Referring to FIG. 31A, the radar control unit 210, at step S60, increments a counter i (i←i+1). The counter i indicates a specific range of the beam scanning of the radar unit 120 for one of forty subsections. When the radar control unit 210 is in an initial condition, the counter i is reset to zero.

After the step S60 is performed, step S61 detects whether the data of the reflection signals for the range "i" indicated by the counter i is input.

When the inputting of the data is not completed, the result at the step S61 is negative. At this time, the step S61 is repeated until the inputting of the data is completed.

When the result at the step S61 is affirmative, step S62 is performed. Step S62 performs the radar signal processing of the data of the reflection signals for the range of the beam scanning so that the spectrum level peaks of the up-frequency and the down-frequency for that range are determined.

After the step S62 is performed, step S63 is performed. Step S63 detects whether the number of peaks included in the spectrum level data for one of the up-frequency and the down-frequency is greater than one.

When the result at the step S63 is negative, step S66 is performed and steps S64 and S65 are not performed. At this time, a single set of the spectrum level peaks of the up-frequency and the down-frequency can be easily and accurately determined as in the case of FIGS. 27A and 27B or FIGS. 29A and 29B.

When the result at the step S63 is affirmative, step S64 is performed. At this time, a plurality of sets of the spectrum level peaks of the up-frequency and the down-frequency related to a plurality of targets are determined as in the case of FIGS. 28A and 28B. Step S64 performs a pairing of the spectrum level peaks related to the target and a pairing of the spectrum level peaks related to another target on the order of the frequency of each peak.

After the step S64 is performed, step S65 detects whether a correlation factor of the spectrum level peaks of each set is above a threshold value αth.

The correlation factor is determined based on the shape of the spectrum level chart for the spectrum level peaks of each pair. When the spectrum level peaks are related to the same target, the correlation factor is set at a relatively great value. On the other hand, when the spectrum level peaks are related to different targets, the correlation factor is set at a relatively small value. At this time, the result at the step S65 is negative.

When the result at the step S65 is affirmative, it is determined that the pairings of the spectrum level peaks related to the plurality of targets are suitably performed. At this time, step S66 is performed. Step S66 determines the values of the relative distance L and the relative velocity Vr related to each target, and stores the determined values of the relative distance L and the relative velocity Vr of the target and the value of the counter i (indicating the range of the beam scanning) related thereto in a memory of the radar control unit 210.

When the result at the step S65 is negative, it is determined that the pairings of the spectrum level peaks related to the plurality of targets are not suitably performed. At this time, step S67 is performed. Step S67 stores the data of the spectrum level peaks in one of unfixed-peak areas of the memory of the radar control unit 210. In this embodiment, the stored data at the step S67 includes the value of the counter i, the spectrum level peaks, and the frequencies of the spectrum level peaks.

After the step S66 or the step S67 is performed, step S68 is performed. Step S68 detects whether the value of the counter i is above a predetermined value n. The predetermined value n indicates the final range of the beam scanning of the radar unit 120.

When the result at the step S68 is negative, it is determined that the inputting of the data of reflection signals for all the ranges of the beam scanning is not completed. At this time, the above steps S60 through S67 are repeated until the inputting of all the data is completed.

When the result at the step S68 is affirmative, it is determined that the inputting of all the data is completed. At this time, step S69 is performed. Step S69 resets the counter i to zero (i←0). After the step S69 is performed, step S70 in FIG. 31B is performed.

Referring to FIG. 31B, step S70 sets a counter j at an unfixed-peak area number. This unfixed-peak area number indicates the unfixed-peak area of the memory of the radar control unit 210 in which the data of the spectrum level peaks is stored at the step S67. The value of the counter j at the step S70 indicates a specific one of the unfixed-peak areas of the memory of the radar control unit 210.

After the step S70 is performed, step S71 sets a counter k at the value (j−1).

Step S72 detects whether the data of the spectrum level peaks stored in the unfixed-peak area indicated by the value of the counter k has been fixed to determine the values of the relative distance and the relative velocity.

When the result at the step S72 is negative, it is determined that the data of the spectrum level peaks stored in the area "k" has not been fixed. At this time, step S73 is performed. Step S73 detects whether the value of the counter k is smaller than the value of the counter j.

When the result at the step S73 is affirmative (k<j), step S74 decrements the counter k (k←k−1). On the other hand, when the result at the step S73 is negative (k≧j), step S75 increments the counter k (k←k+1).

After the step S74 or the step S75 is performed, the above step S72 is repeated until it is determined that the data of the spectrum level peaks stored in the area "k" has been fixed.

When the result at the step S72 is affirmative, it is determined that the data of the spectrum level peaks stored in the area "k" has been fixed. At this time, step S76 is performed. Step S76 detects whether the spectrum level peaks stored in the area "k" are the same as those stored in an adjacent unfixed-peak area of the memory which is adjacent to the area "k".

When the result at the step S76 is affirmative, it is determined that the pairings of the spectrum level peaks are suitably performed based on the peaks in the adjacent area which are the same. At this time, step S78 is performed.

On the other hand, when the result at the step S76 is negative, it is determined that the pairings of the spectrum level peaks in this case cannot be suitably performed. At this time, step S77 is performed. Step S77 sets the counter k at the value (j+1). After the step S77 is performed, the above step S72 is repeated.

Step S78 performs the pairings of the spectrum level peaks related to the data in the area "k" based on the peaks in the adjacent area. Since the number of the peaks included in the data in the area "k" is reduced, the pairings of the spectrum level peaks are easily performed.

After the step S78 is performed, step S79 is performed. Step S79 performs the pairings of the remaining spectrum level peaks in the data in the area "k" on the order of the frequency of each peak and by using the correlation factor as in the steps S64 through S67.

After the step S79 is performed, step S80 is performed. Step S80 detects whether all the data of the spectrum level peaks stored in all the unfixed-peak areas of the memory have been fixed to determine the values of the relative distance and the relative velocity.

When the result at the step S80 is negative, the steps S70 through S79 are repeated until all the data of the spectrum level peaks are fixed. On the other hand, when the result at the step S80 is affirmative, the control procedure of the radar control unit 210 at the present cycle ends.

It is possible that the radar apparatus of the present embodiment easily and accurately detects individual targets in a forward direction of the vehicle by separately performing a pairing of the data of received reflection signals related to one target and a pairing of the data of received reflection signals related to another target when a plurality of targets in the forward direction of the vehicle are detected. By performing the steps S70 through S78, the radar control unit 210 can separately perform the pairings of the spectrum level peaks in the unfixed-peak areas related to the plurality of targets, so that the relative distance and the relative velocity of each of the targets can be easily and accurately determined.

Further, the present invention is not limited to the above-described embodiments, and variations and modifications may be made according to the present invention.

What is claimed is:

1. A radar apparatus of an automotive vehicle, comprising:

radar means for radiating an electromagnetic wave to a target in a forward direction of the vehicle and for receiving reflection beams from the target to detect the target;

scanning control means for performing a beam scanning of the radar means to the target so that the reflection beams during the beam scanning are received; and center direction determining means for detecting a distribution pattern of the received reflection beams with respect to respective scanning angles of the radar means, for performing a similarity approximation of the distribution pattern by using an antenna directional gain pattern of the radar means to produce an approximated distribution pattern, and for determining a direction of a center of the target based on a peak of the approximated distribution pattern.

2. The radar apparatus according to claim 1, further comprising:

correcting means for determining a corrected center scanning angle from a reference range value corresponding to a beam scanning range of the radar means for a width of the target, and from a scanning angle of the radar means corresponding to a mid-point of lower and upper limits of the scanning angle in the distribution pattern, when the vehicle is running along a curved path and the beam scanning range is below the reference range value.

3. The radar apparatus according to claim 2, wherein said correcting means includes:

means for detecting whether the vehicle is running along a curved path, by comparing a radius of curvature of a present path along which the vehicle is presently running with a predetermined reference value, said radius of curvature being determined by using a measured yaw rate and a measured vehicle speed.

4. The radar apparatus according to claim 2, wherein said correcting means includes:

means for detecting whether a beam radiation axis of the radar means directed to the target is slanting with respect to the forward direction of the vehicle.

5. The radar apparatus according to claim 1, wherein, when the vehicle is not running along a curved path, said center direction determining means generates a signal indicating the direction of the center of the target for a center scanning angle of the radar means.

6. The radar apparatus according to claim 1, wherein, when a beam radiation axis of the radar means directed to the target is not slanting with respect to the forward direction of the vehicle, said center direction determining means generates a signal indicating the direction of the center of the target for a center scanning angle of the radar means.

7. The radar apparatus according to claim 1, further comprising:

alarm means for providing a warning of a dangerous condition of the vehicle to a vehicle operator when the vehicle is detected to be in the dangerous condition with respect to the target, based a relative distance of the target and a relative velocity of the target.

8. The radar apparatus according to claim 1, wherein said radar apparatus includes a yaw rate sensor connected to an electronic control unit, said yaw rate sensor measuring a yaw rate of the vehicle and supplying the measured yaw rate to the electronic control unit.

9. The radar apparatus according to claim 1, wherein said radar apparatus includes a vehicle speed sensor connected to an electronic control unit, said vehicle speed sensor measuring a vehicle speed of the vehicle and supplying the measured vehicle speed to the electronic control unit.

10. The radar apparatus according to claim 1, wherein said radar means is a frequency-modulation-continuous-wave radar unit which radiates an extremely-high-frequency electromagnetic wave.

* * * * *